US011105909B2

(12) United States Patent
Argentieri et al.

(10) Patent No.: US 11,105,909 B2
(45) Date of Patent: Aug. 31, 2021

(54) TRACKING SYSTEM FOR PERSONS AND/OR OBJECTS

(71) Applicant: TimeKeeping Systems, Inc., Solon, OH (US)

(72) Inventors: Paolo Argentieri, Signal Hill, CA (US); Nicholas F. Papatonis, Cuyahoga Falls, OH (US); John E. Hansley, II, Auburn, OH (US); Roger W. Stahl, Mantua, OH (US); John W. Hoffman, Mentor, OH (US); Jason D. Doyle, Mantua, OH (US); Barry J. Markwitz, Solon, OH (US); Dean M. Chriss, Euclid, OH (US)

(73) Assignee: TIMEKEEPING SYSTEMS, INC., Solon, OH (US)

( * ) Notice: Subject to any disclaimer, the term of this patent is extended or adjusted under 35 U.S.C. 154(b) by 0 days.

(21) Appl. No.: 16/428,950

(22) Filed: May 31, 2019

(65) Prior Publication Data
US 2019/0383921 A1    Dec. 19, 2019

Related U.S. Application Data

(63) Continuation-in-part of application No. 14/998,697, filed on Feb. 3, 2016.

(60) Provisional application No. 62/125,964, filed on Feb. 4, 2015.

(51) Int. Cl.
*G01S 11/06* (2006.01)
*G06K 7/10* (2006.01)

(52) U.S. Cl.
CPC .......... *G01S 11/06* (2013.01); *G06K 7/10425* (2013.01); *G06K 7/10475* (2013.01)

(58) Field of Classification Search
CPC . G01S 11/06; G06K 7/10425; G06K 7/10475
USPC ..................................... 340/539.13
See application file for complete search history.

(56) References Cited

U.S. PATENT DOCUMENTS

| | | | | |
|---|---|---|---|---|
| 7,295,108 B2* | 11/2007 | Corrado | ............. | G06K 7/10079 340/10.1 |
| 8,089,371 B2* | 1/2012 | Pandey | ................ | G06K 7/0008 340/10.2 |
| 2002/0190845 A1* | 12/2002 | Moore | ............... | G06K 7/10336 340/10.3 |

(Continued)

*Primary Examiner* — Kerri L McNally
(74) *Attorney, Agent, or Firm* — David A. Burge; Benjamin D. Burge

(57) ABSTRACT

A tracking system that tracks persons and/or objects of interest without the need for triangulation techniques is disclosed. The tracking system utilizes very low power active radio frequency tags with limited effective broadcast range that operate only in the transmit mode with no need to establish two-way communication with any part of the system. The person or object of interest is provided with a radio frequency tag incorporating a unique identifier. Gateways connected to a common network interface are positioned relative to specific areas within the facility to be monitored. A computer connected to the same network as the gateways analyzes data relating to the strength of the of the radio frequency signals received by the radio frequency receivers from the radio frequency tags to determine if, and when, persons and/or objects of interest are present within particular subareas within the facility.

20 Claims, 12 Drawing Sheets

(56) References Cited

U.S. PATENT DOCUMENTS

2012/0013509 A1\* 1/2012 Wisherd ................ G01S 5/0252
 342/451
2014/0035726 A1\* 2/2014 Schoner ................ H04W 4/029
 340/8.1

\* cited by examiner

TRACKING SYSTEM FOR PERSONS AND/OR OBJECTS

REFERENCE TO RELATED APPLICATION

This US utility patent application is a continuation-in-part of U.S. utility patent application Ser. No. 14/998,697 filed Feb. 3, 2016 by Paolo Argentieri et al., and entitled TRACKING SYSTEM FOR PERSONS AND/OR OBJECTS; which claims the benefit of priority to U.S. provisional application Ser. No. 62/125,964 filed Feb. 4, 2015 by Paolo Argentieri et al., and entitled TRACKING SYSTEM FOR PERSONS AND/OR OBJECTS; the disclosures of each of which is incorporated herein by reference in its entirety for all purposes.

TECHNICAL FIELD

The present invention relates, in general, to tracking systems and, more particularly, to tracking systems that are utilized to track persons and/or objects of interest.

BACKGROUND ART

Systems for tracking persons and/or objects of interest in correctional, healthcare, and other facilities presently exist, but they have serious inherent disadvantages that are difficult and expensive to overcome. Such systems typically require that all persons and/or objects of interest be fitted with RFID tags that must be visible to the system at all times in order to make a determination as to the location of a specific person and/or object of interest within the facility. The amount of hardware required to cover all areas within a large and complex facility makes such systems extremely expensive to install, and the installation process may be disruptive to the operation of the facility. Where present systems provide continuous visibility of persons and/or objects of interest, the systems often provide the system user with more information than required. For example, a system user may need to know if a person of interest has visited a specific area, such as a clinic, while not needing to know the exact location within the clinic that the person of interest visited.

Present tracking systems typically utilize RFID tags and multilateration or triangulation techniques by multiple antennas and receivers to determine the location of RFID tags carried by persons and/or objects of interest. These systems have a number of significant inherent problems. Conventional systems usually use Wi-Fi RFID tags that must establish a connection with at least two networked wireless access points that are positioned throughout the monitored areas. Because a two-way connection is required, each RFID tag must incorporate a relatively expensive transceiver. The wireless access points also incorporate relatively expensive radio transceivers that are connected to a Local Area Network (LAN). Also, the power consumption overhead associated with establishing these two-way connections between the RFID tag and the access points, and the power levels required for a RFID tag to be constantly visible to multiple wireless access points, necessitates the use of relatively large rechargeable batteries to power the tags. This situation, in turn, necessitates the use of associated battery rechargers, disruption of the activities of monitored persons in order to perform battery recharging, and the expenditure of time by facility staff members to perform the battery recharging process, all of which adds to the overall cost of the tracking system.

Because the ID transmissions from RFID tags have a relatively short range, and every possible location within the facility must be within the range of multiple spatially separated antennas, a large number of antennas, each with an associated wireless access point and cabling is required, which makes such multilateration and triangulation based RFID locating systems very expensive. Exacerbating this problem, many of the building materials present in correctional, healthcare, and other facilities can degrade the accuracy of multilateration and triangulation based locating systems. For example, concrete walls are typically opaque to the weak signals transmitted by RFID tags because the walls absorb the energy of the signal. Metal doors and furniture are also opaque to these signals, but since such doors and furniture reflect signals, they produce multipath effects and increased positioning errors. At the same time, thick acrylic windows, which are sometimes used to separate secured areas within such facilities, are transparent to RFID signals. These factors further reduce the useable distance between RFID tags and system antennas, necessitating the use of additional antennas, which increases the already high cost of hardware and installation of such systems.

In addition, the process of installing the numerous antennas, cabling and associated electronic equipment at locations throughout a facility, particularly a correctional facility, is disruptive to the operation of the facility. Even when a complex installation has been completed, dead zones in which RFID tags cannot be tracked often remain. When visibility of a person and/or object of interest is not available in response to an inquiry by a system user as to the present location of such person and/or object, these systems may provide no useful information. While the continuous, exact, real-time position tracking provided by a properly functioning multilateration or triangulation-based RFID locating system can satisfy the needs of many correctional, healthcare, and other facilities, these systems provide, at great cost, functionality that may extend well beyond the needs of most users. Some of the functionality typically goes completely unused due to existing statutory regulations and procedures. For example, such systems in correctional facilities are capable of providing features such as automated head counts, while laws in many jurisdictions require that head counts have visual confirmation of prisoner identity by a correctional facility staff member.

The tracking system features that correctional and other facilities typically require and use are those directed at proving compliance with statutory standards and at limiting liability. For example, a certain amount of recreation time is mandated for correctional facility inmates in most jurisdictions, and inmate tracking systems can be used to show that inmates received the mandated amount of time in the facility's recreation area. In the same manner, these systems can show that an inmate was in the clinic area of the facility at a given time to help counter claims that the inmate did not receive medical treatment.

Inmate tracking systems are also used for general inmate management, such as determining which inmates are present in certain housing units, and/or other parts of the facility. Feedback from users of present systems indicates that the systems need not determine the exact location of the inmates, but rather the systems must determine when, and if, the inmates are present in certain areas of the facility. For example, a correctional facility may need to determine when a particular inmate visited the clinic without needing to determine the exact location of the inmate within the clinic. Similarly, these facilities may need to determine whether the inmate has received mandated recreation time, counseling, attorney visits, or whether the inmate has been present in the same room or area with another inmate with whom the inmate is not allowed to interact, and the like. It should be noted that some correctional facilities utilize a camera-based system to track inmate movement but, like the RFID tracking systems previously discussed, these systems also require that the inmates be continuously within the field of view of at least one of the cameras of the system. Like RFID tracking systems, when such inmate visibility does not exist, the system can provide no information as to the location of the inmate.

In view of the foregoing inherent problems associated with the prior art tracking systems, it has become desirable to develop a system for tracking persons and/or objects of interest that does not utilize multilateration or triangulation techniques while retaining most of the benefits of the multilateration or triangulation systems.

SUMMARY OF THE INVENTION

The present invention solves the problems associated with the prior art tracking systems, and other problems, by providing a radio-based tracking system that does not require triangulation techniques. The tracking system of the present invention utilizes small battery powered radio frequency transmitters that each transmits a unique identifier, hereinafter referred to as radio frequency tags. These radio frequency tags broadcast at very low power levels and consequently have a limited range. The tags normally operate in the transmit-only mode with no need to establish a two-way connection with any part of the system. The monitored area can comprise an entire facility or a portion thereof. This monitored area is divided into subareas. Subarea boundaries are usually defined by walls or room boundaries within a facility, but subarea boundaries can be arbitrary, if desired. Positioned relative to each subarea is a receiving device, hereinafter referred to as a gateway. Each gateway incorporates one or more radio frequency receivers, antennas with limited and shapeable fields of view, and a network interface for interfacing the radio frequency receivers to a LAN or other network. The field of view of each gateway is limited and shaped to encompass a part of the associated subarea that a person or object of interest must pass through or be within in order to be located in the associated subarea. The foregoing arrangement allows the use of a minimal number of gateways, each with a field of view covering only a small portion of the facility, and further allows the use of small radio frequency tags that can operate for several years on a coin cell battery. A computer connected to the same network as the aforementioned gateways utilizes predetermined rules to analyze data provided by the gateways to determine the location of each radio frequency tag and provides system user with the ability to determine if, and when, persons and/or objects of interest are present within specific subareas within a monitored facility regardless of whether the presence of the person and/or object of interest can be continuously detected by the system.

DESCRIPTION OF THE PREFERRED EMBODIMENT

Figure 1:
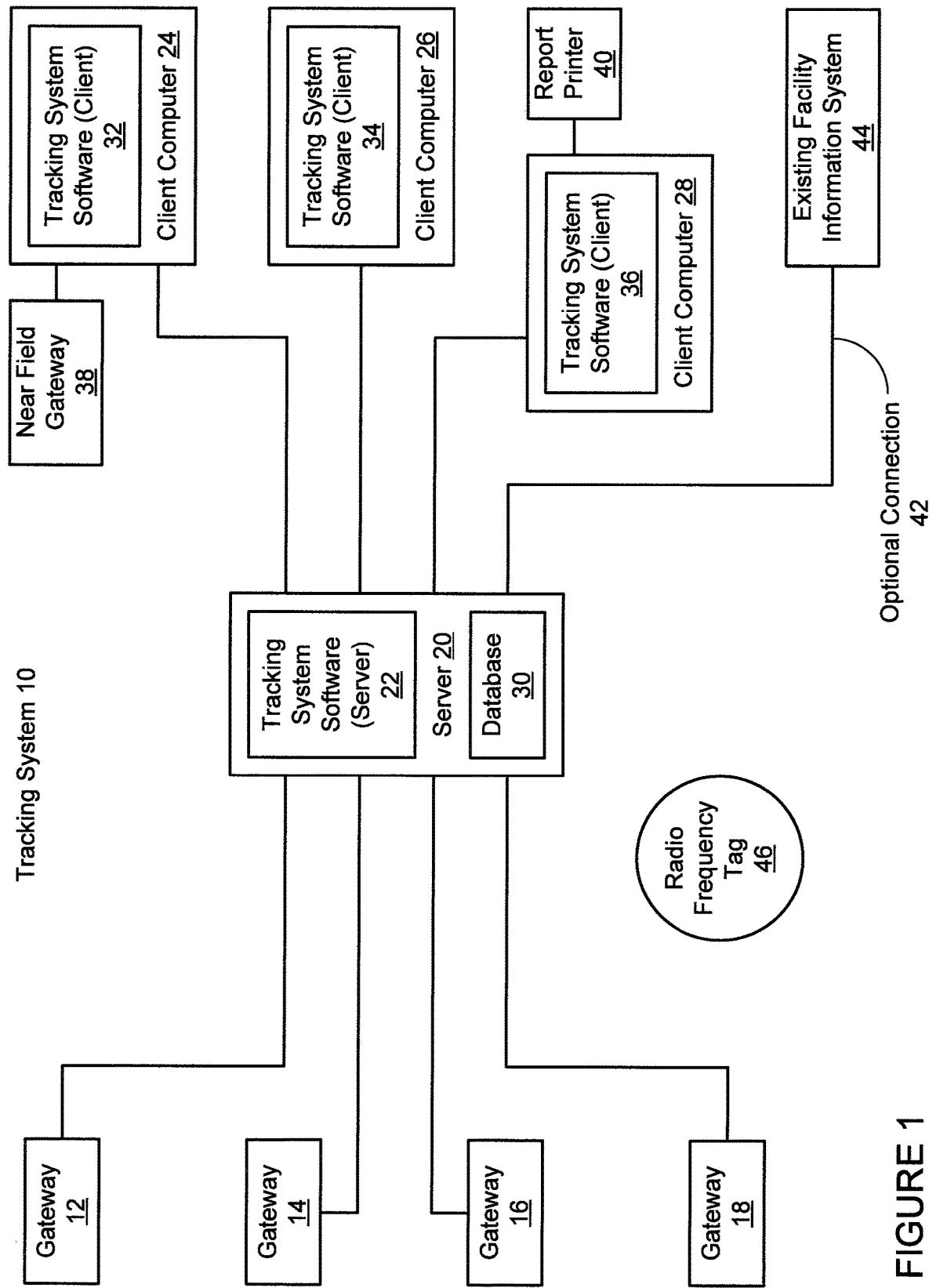
FIG. 1 is a schematic diagram of the fundamental components utilized by the tracking system of the present invention.

The present invention is directed to a system that can monitor the location of persons and/or objects of interest that move between specific subareas or rooms, hereinafter referred to as subareas, within a monitored facility. The system can determine the particular subarea within which any monitored person and/or object of interest is present, regardless of whether the presence of the person or object can be continuously or presently detected. The foregoing is made possible by a novel combination of radio frequency technology, installation procedures, hardware and software.

The system of the present invention satisfies the need of correctional and other facilities to track the location of persons and/or objects of interest at a greatly reduced cost and complexity in comparison to tracking systems based on multilateration or triangulation techniques. Because it is usually adequate to determine the particular subarea within a facility in which a monitored person and/or object is present, without determining the exact location of the person or object within that subarea, there is no need for the system to have constant visibility to every radio frequency tag. This greatly simplifies the overall system while reducing facility wiring and other hardware requirements which significantly reduces total system costs.

The present invention utilizes radio frequency technology in a manner that overcomes or reduces the problems associated with present tracking systems because neither multilateration nor triangulation techniques are utilized. Instead the system of the present invention utilizes very low power active radio frequency tags that operate in a transmit-only mode. Unlike other active RFID tags, such as those utilizing a Wi-Fi connection, there is no need to establish a two-way connection with any part of the system. This greatly reduces power consumption and permits the use of small radio frequency tags that can operate for several years on a coin cell battery. In some embodiments, these radio frequency tags incorporate a receiver section for the purposes of configuration and activating the tags to begin service, but in normal operation the radio frequency tags operate in a transmit-only mode.

Each radio frequency tag incorporates a unique identifier that, along with data uniquely identifying each radio frequency message, is transmitted substantially periodically on each of one or more radio frequencies or channels. If more than one channel is used, a transmission occurs on each channel during a single "awake" period with the minimum possible time between successive transmissions. This maximizes the amount of time the transmitter and associated electronics can spend in a low power "sleep" state, thus maximizing battery life. The use of multiple transmissions of the same data, each on a different channel, is advantageous to minimize lost data due to collisions when many radio frequency tags are in proximity to one another. Additionally, the channel order within each set of transmissions is randomized and a small random amount of time is added to or subtracted from the predetermined radio frequency tag transmission period.

Referring now to the drawings where the illustrations are for the purpose of describing the preferred embodiment of the present invention and are not intended to limit the invention described herein, FIG. 1 is a schematic diagram of the fundamental components comprising the preferred embodiment of the tracking system 10 of the present invention. Located relative to subareas within the facility (not specifically shown) are gateways 12, 14, 16 and 18, each including a single channel receiver for every transmission channel used by multiple radio frequency tags 46 of the system 10 and a network interface. For example, if the radio frequency tags 46 of the system 10 transmit on four channels, the gateways 12, 14, 16 and 18 of the system 10 would each contain four single channel receivers (not specifically shown), each receiver being dedicated to one radio frequency tag transmission channel. Each single channel receiver within each gateway 12, 14, 16 or 18 includes its own integral microprocessor and an associated antenna and is connected to a network interface common to all single channel radio frequency receivers within the gateway 12, 14, 16 or 18. These single channel receivers, together with their integral microprocessors, associated antennas, and common network interface, are all positioned on a single printed circuit board. The antennas are etched on the printed circuit board along with other circuitry for cost and space savings. Each single channel receiver has its own antenna, and the antennas of the single channel receivers are oriented in a circular pattern with substantially equal angles between adjacent antennas. For example, if four antennas are used, the antennas would be positioned at an angle of 90 degrees between adjacent antennas.

The use of multiple single channel receivers in the gateways 12, 14, 16 and 18 has several advantages. Because each transmitted message can be uniquely identified, it is possible to time-align and compare the same message across multiple single channel receivers in a given gateway to help negate the impact of variance in the effective transmission power received from a radio frequency tag 46. The use of multiple antennas positioned as previously described allows for the reduction of polarization effects by averaging the power received across the antennas for each received message, and overall creates a more omnidirectional reception pattern than would be possible with a single comparably sized printed antenna. In addition, the use of multiple single channel receivers in the gateways 12, 14, 16 and 18 increases the maximum throughput when many radio frequency tags are within the antennas' combined fields of view, and also makes the previously described channel randomization more effective as a collision avoidance mechanism. The combined field of view of all antennas within a gateway 12, 14, 16 or 18 is hereinafter referred to as the field of view of the gateway 12, 14, 16 or 18.

All circuitry comprising a gateway 12, 14, 16 or 18 is contained in a small number of integrated circuits and a single printed circuit board making the gateways 12, 14, 16 and 18 compact, low cost and light weight relative to typical RFID system readers, wireless access points, and transceivers that have separate antennas. The field of view of each gateway 12, 14, 16 or 18 can be changed from relatively omnidirectional to relatively directional by removing or installing within the enclosure appropriate electromagnetic baffles or shields that are opaque and/or absorptive to radio frequency transmissions from the radio frequency tags 46. This allows the system 10 to utilize fewer gateways, each with a field of view covering a part of the associated subarea that a person or object of interest must pass through or be within in order to be located in the associated subarea. This eliminates the need, and the associated hardware, to cover the entire subarea. If the field of view of a single gateway 12, 14, 16 or 18 cannot be made large enough to accomplish the foregoing, multiple gateways 12, 14, 16 and/or 18 associated with the same subarea can be utilized.

In order to implement the system 10 of the present invention, the facility to be monitored is divided into subareas that do not overlap and comprise the entire facility or the portion of the facility to be monitored. A subarea typically encompasses an existing room, group of rooms, or even buildings. However, an open area without walls can be divided into subareas and monitored in the same manner. The subareas of the system 10 are defined and associated with a unique subarea identifier within the software of the present invention when the system 10 is deployed.

Each gateway 12, 14, 16 or 18 is associated with only one subarea, and each subarea which is to be monitored is associated with at least one gateway 12, 14, 16 or 18. The number and position of gateways 12, 14, 16 and/or 18 associated with any given subarea is such that all persons and/or objects of interest must pass through the field of view of at least one gateway 12, 14, 16 or 18 associated with the specific subarea in order to be located within that subarea.

Referring again to FIG. 1, the gateways 12, 14, 16 and 18 are connected to, controlled by and monitored by a computer 20 executing software 22 of the present invention. The foregoing connections are typically made via a Local Area Network (LAN), though other connection types are possible. Associations between gateways 12, 14, 16 and 18 and subareas are entered into the system 10 when the system 10 is configured. It should be noted that large portions of a subarea may not be within the field of view of any gateway 12, 14, 16 or 18. This arrangement can greatly reduce the cost of the system relative to other typical positioning systems by reducing hardware and installation requirements and can also reduce disruption resulting from installation activities. For example, when it is desired to determine whether a person or object of interest is outside the presently monitored facility, all locations outside the facility are treated like an additional subarea of the system 10 that is external to the facility. In this case, at least one gateway 12, 14, 16 or 18 associated with the subarea consisting of all locations outside the facility must be positioned such that persons and/or objects of interest leaving or entering the monitored facility must pass through the field of view of this gateway or gateways 12, 14, 16 and/or 18.

Persons and/or objects of interest that are to be monitored by the system 10 of the present invention are each fitted with one of the radio frequency tags 46. The unique identifier of each radio frequency tag 46 is entered into the system 10 of the present invention by using a near field gateway 38 connected to a client computer 24. The near field gateway 38 is a gateway with an extremely restricted field of view that extends only a few inches from its housing. Typically, the near field gateway 38 has a metal housing that enables reading the unique identifier of a single radio frequency tag 46 held directly in front of a plastic portal in front of its housing. A system user reads the unique identifier of a particular radio frequency tag 46 with the near field gateway 38 and then associates the unique identifier with the name and optionally other identification information of the person or object of interest to be fitted with the particular radio frequency tag 46. The radio frequency tag 46 is then fitted on the person or object of interest. The software 32 of the client computer 24 of the present invention communicates the association between the unique radio frequency tag identifier and the identification information of the person or object of interest to which it is fitted to the computer 20 which stores the information in a database 30 for use by the tracking system software 22. Functions of the system 10 and its data are accessed by client computers 24, 26 and 28 that are executing tracking system client software 32, 34 and 36, respectively. The foregoing allows system users to analyze data and produce reports on various devices, such as printer 40. It is also possible for computer 20 to issue notifications of certain predefined conditions to devices, such as cellular telephones, email addresses, fax machines, and the like. Optionally, if an existing facility information system 44 utilizes data that is required by the system 10 of this invention (e.g., names of persons and/or objects of interest to be tracked), an optional network connection 42 can be made to allow sharing the aforementioned data and thereby avoid the necessity of entering the same data into both systems 10 and 44. This is particularly useful in correctional and healthcare facilities, which typically have such existing systems, and where persons of interest are continually changing with bookings and admissions, and releases and discharges, respectively.

The system 10 of the present invention can associate any unique radio frequency tag identifier with a particular person or object of interest, collect the unique identifier of any radio frequency tag 46 upon entry to a specific subarea by means of at least one gateway 12, 14, 16 or 18 of the system 10, and associate any particular gateway 12, 14, 16 or 18 with a specific subarea. In view of the foregoing, the software of the system 10 can logically determine that any person or object detected within a specific subarea continues to be present within that subarea, regardless of whether that person or object is presently detected by any other gateway 12, 14, 16 or 18 of the system 10 until the person or object is detected in a different subarea. Determining the location of persons and/or objects of interest in this manner is straight forward only when the fields of view of all gateways 12, 14, 16 and 18 are completely contained within their respective associated subareas. This is often not the case.

Gateways associated with adjoining subareas often have overlapping fields of view. When persons and/or objects of interest being tracked are within overlapping fields of view, techniques and apparatuses are utilized that, when combined, provide accurate and stable location determinations. The following definitions are referred to in the in the discussion that follows:

RSSI: This value refers to the Received Signal Strength Indication as measured directly by a gateway.

Perceived signal strength: This value is the age weighted moving average of the received signal strength measured by the gateway for a particular radio frequency tag. This age weighting gives the most weight to the most recent transmissions while older transmissions become inconsequential after a short period of time. Use of this age weighted moving average has the effect of smoothing short lived spurious values caused by reflections and the like without adding significant latency. It is understood that different methods for smoothing RSSI values could be used effectively.

Low Confidence Region: This region refers to the volume between two adjacent gateways with overlapping fields of view within which the difference in perceived signal strength between the gateways is equal within normal statistical variation.

Radio frequency tag location resolution: This parameter is the standard deviation of the difference in radio frequency tag perceived signal strength between two gateways. This parameter is affected by many factors, such as:

distance from each gateway;

velocity of radio frequency tag movement;

radio frequency tag power output;

antenna topology;

RSSI sample smoothing logic and number of samples used. For example, more samples used in the perceived signal strength smoothing calculation decreases the standard deviation but increases latency; and environmental factors including radio frequency shielding, reflection, and absorption from various building materials and furnishings.

Figure 2:
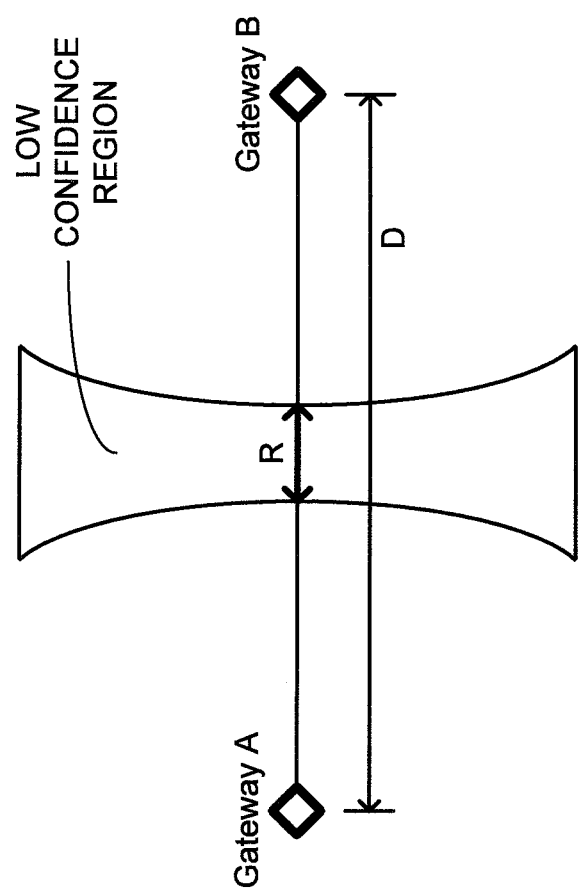
FIG. 2 is an illustration of the cross-section of the three dimensional low confidence region between two gateways with overlapping fields of view.

Referring now to FIG. 2, the shape of the low confidence region between two gateways, A and B (e.g., two of gateways 12, 14, 16 and 18), with overlapping fields of view is illustrated. The shape of the low confidence region depends on the distance D between the gateways A and B, the standard deviation • of the difference in perceived signal strength between the gateways A and B, and the amount by which such difference in perceived signal strength varies when the position of a radio frequency tag 46 is marginally changed.

When the gateways A and B are spaced at an equal distance from a subarea boundary, the width R of the Low Confidence Region along the axis connecting the gateways A and B can be estimated using the formula $R=s/m$ where:

s represents the standard deviation of the difference in perceived signal strength between gateways A and B of a radio frequency tag 46 located on the subarea boundary between the gateways. The value of s can vary by application. For example, s will usually be higher when persons are wearing radio frequency tags 46 on their wrists due to the swinging of their arms while walking, turning, etc., and will usually be lower for tracked objects with radio frequency tags, such as a cart, because there is typically less variation in the radio frequency tag position and other circumstances that affect the Received Signal Strength Indication (RSSI) over short periods of time.

m represents the rate at which the signal strength measured by a gateway (e.g., gateway A or B) increases as the radio frequency tag 46 is moved closer to a subarea boundary.

The values of s and m are both affected by nonlinear path loss in addition to structural materials and other objects in the immediate vicinity, but R=s/m is approximately linear when considering a small region of concern immediately surrounding a subarea boundary where gateways associated with the respective subareas are relatively distant. Typical areas of concern include doorways and other passageways between subareas, where radio frequency tag movement is constrained by a doorway or other passageway, forcing movement to be near a line connecting the gateways. In the previously described circumstances, the values of s and m are relatively unaffected by small variations in distance. For example, when the gateways are positioned at a distance of approximately 10 feet on either side of a doorway that forms a subarea boundary, the values of s and m are relatively constant within two or three feet on either side of the doorway. In addition, because structural materials and other objects in the vicinity affect the values of s and m, these parameters are most accurately determined empirically at the site where the system 10 of the present invention is installed.

To illustrate the approximate size and shape of the low confidence region near a subarea boundary, the following example uses values that were empirically derived in a typical office environment.

$$R=s/m=2.3 \text{ dBm}/0.38 \text{ dBm/feet}=6.1 \text{ feet}$$

Figure 3:
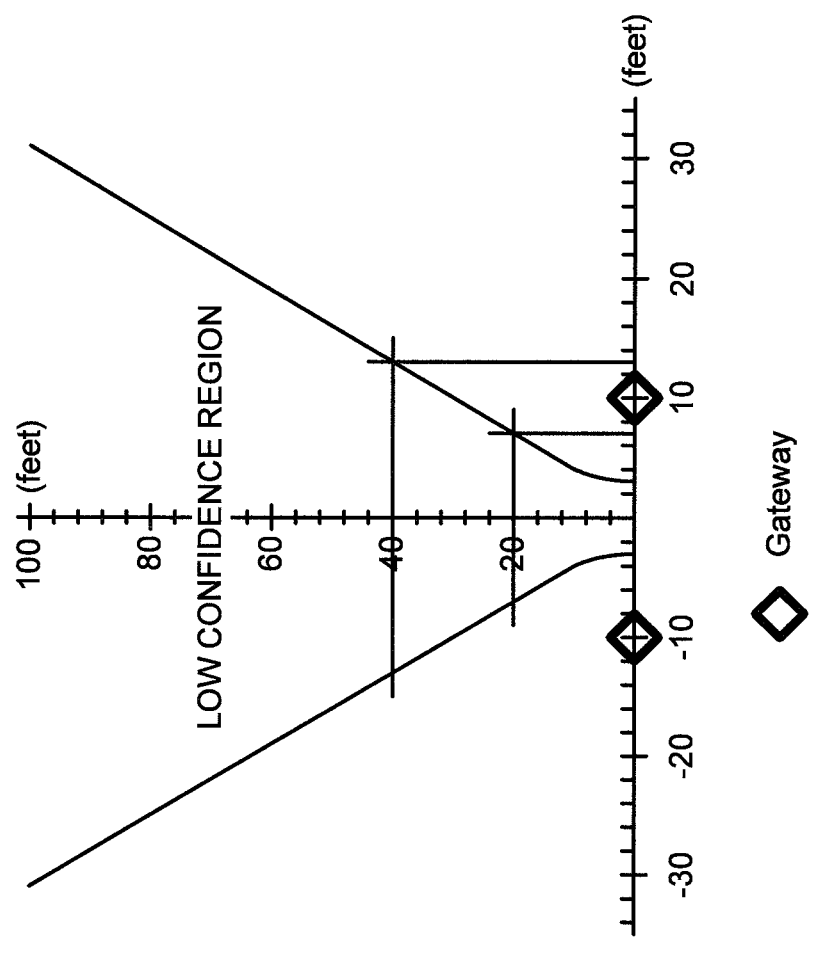
FIG. 3 is a plot of the low confidence region for R=6.1 feet and D=20 feet.
Figure 4:
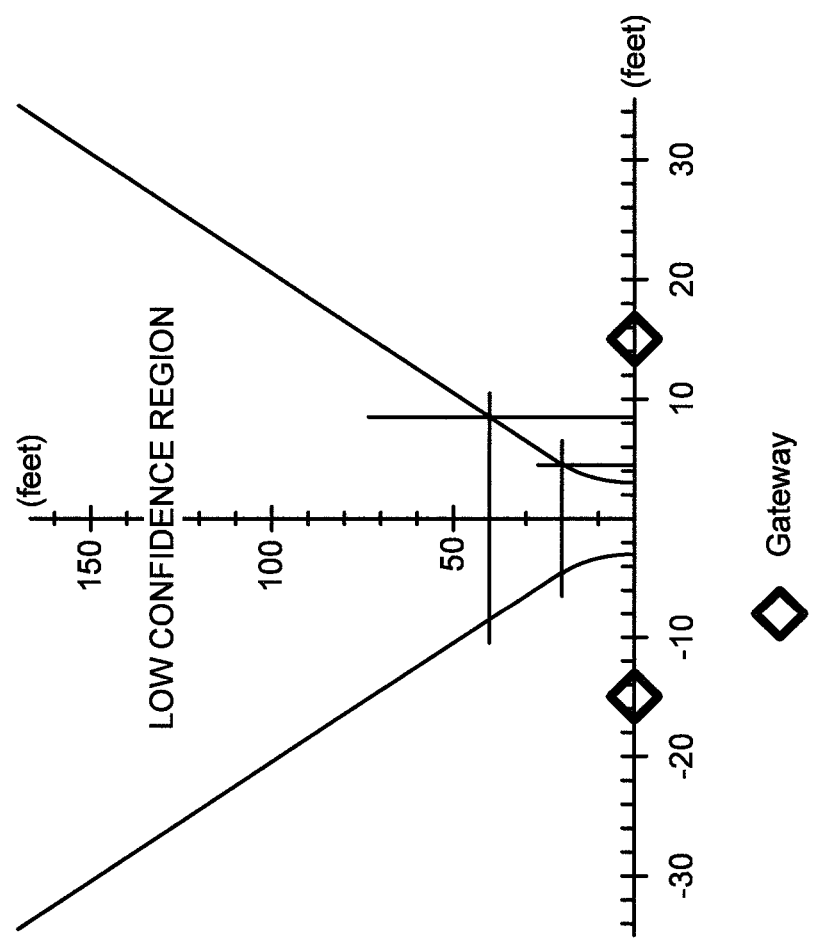
FIG. 4 is a plot of the low confidence region for R=6.1 feet and D=30 feet.

The plot for the low confidence region for R=6.1 feet and where D=20 feet is shown in FIG. 3. Similarly, the plot of the low confidence region for R=6.1 feet and where D=30 feet is shown in FIG. 4.

When the field of view of a particular gateway is well within the boundaries of its associated subarea, radio frequency tags outside the subarea will not be detected, but latency in detecting the presence of a radio frequency tag crossing into the subarea increases. Installations in which gateways associated with adjacent subareas having overlapping fields of view provide minimal latency in identifying subarea boundary crossings. This is the preferred configuration and the configuration assumed in the following discussion.

A subarea boundary between any two adjacent gateways should be as close as possible to the center of the low confidence region so the signal strength from a radio frequency tag 46 transmitting at the subarea boundary is equal at the two adjacent gateways and subarea boundary crossings are identified at or near the actual subarea boundary. From the foregoing, it is apparent that for each gateway in subarea A there should ideally be a corresponding adjacent gateway in subarea B, positioned such that a line connecting the two gateways is perpendicular to the subarea boundary, e.g., a wall or doorway. In addition, the optimal distance between two gateways with overlapping fields of view so as to attain maximum tracking accuracy varies with the speed at which tracked persons or objects move and how often the radio frequency tags 46 transmit their unique identifier. When a radio frequency tag 46 is traveling along a straight line joining gateways A and B, the gateways are positioned such that each gateway A and B receives, at a minimum, one transmission when the radio frequency tag 46 is significantly closer to it than to the other gateways.

Figure 5:
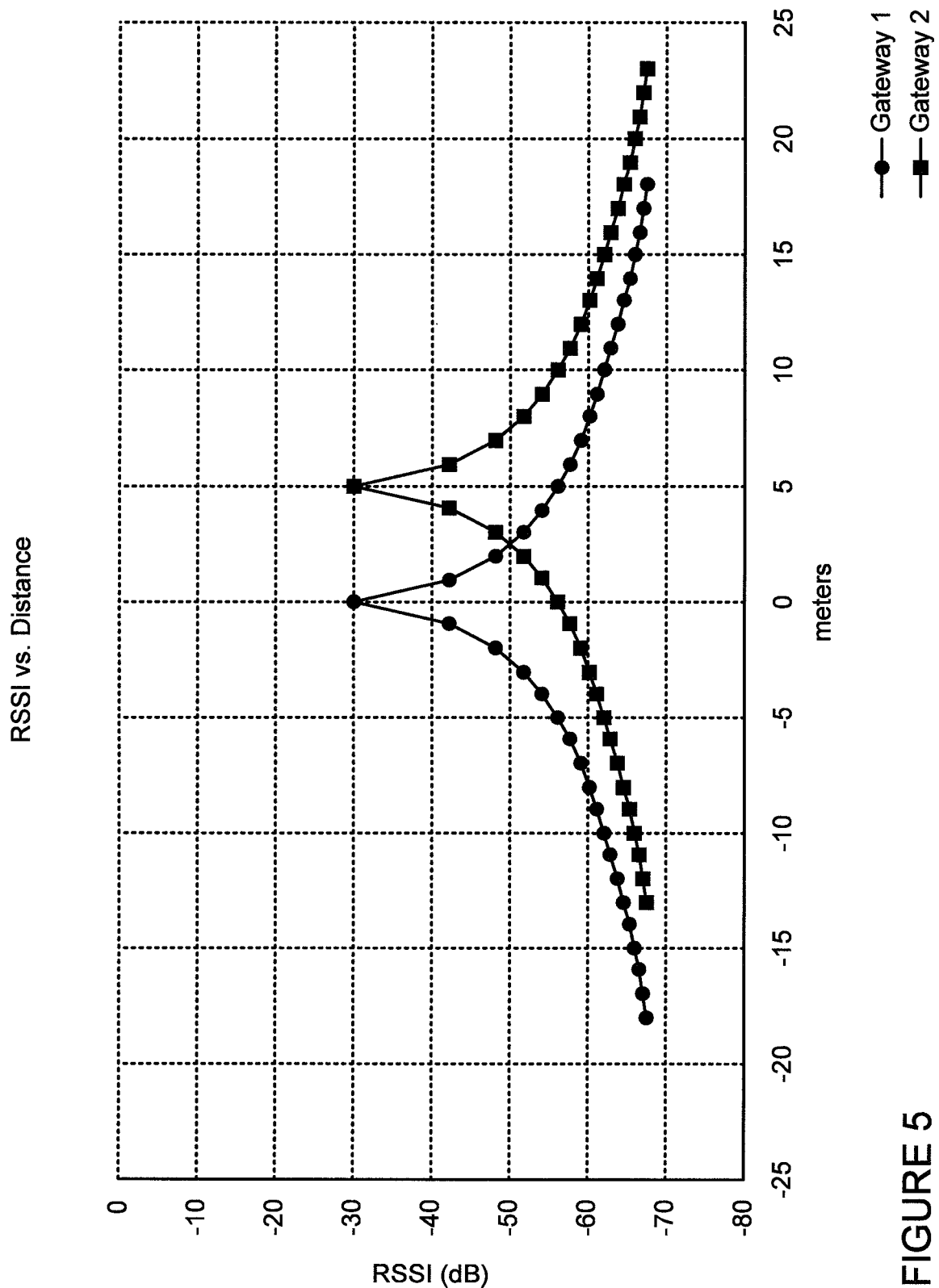
FIG. 5 is a graph of RSSI (Received Signal Strength Indication) values for a pair of gateways positioned five meters apart with a subarea boundary interposed there between and 2.5 meters from each gateway as a radio frequency tag moves along a line joining the gateways.
Figure 6:
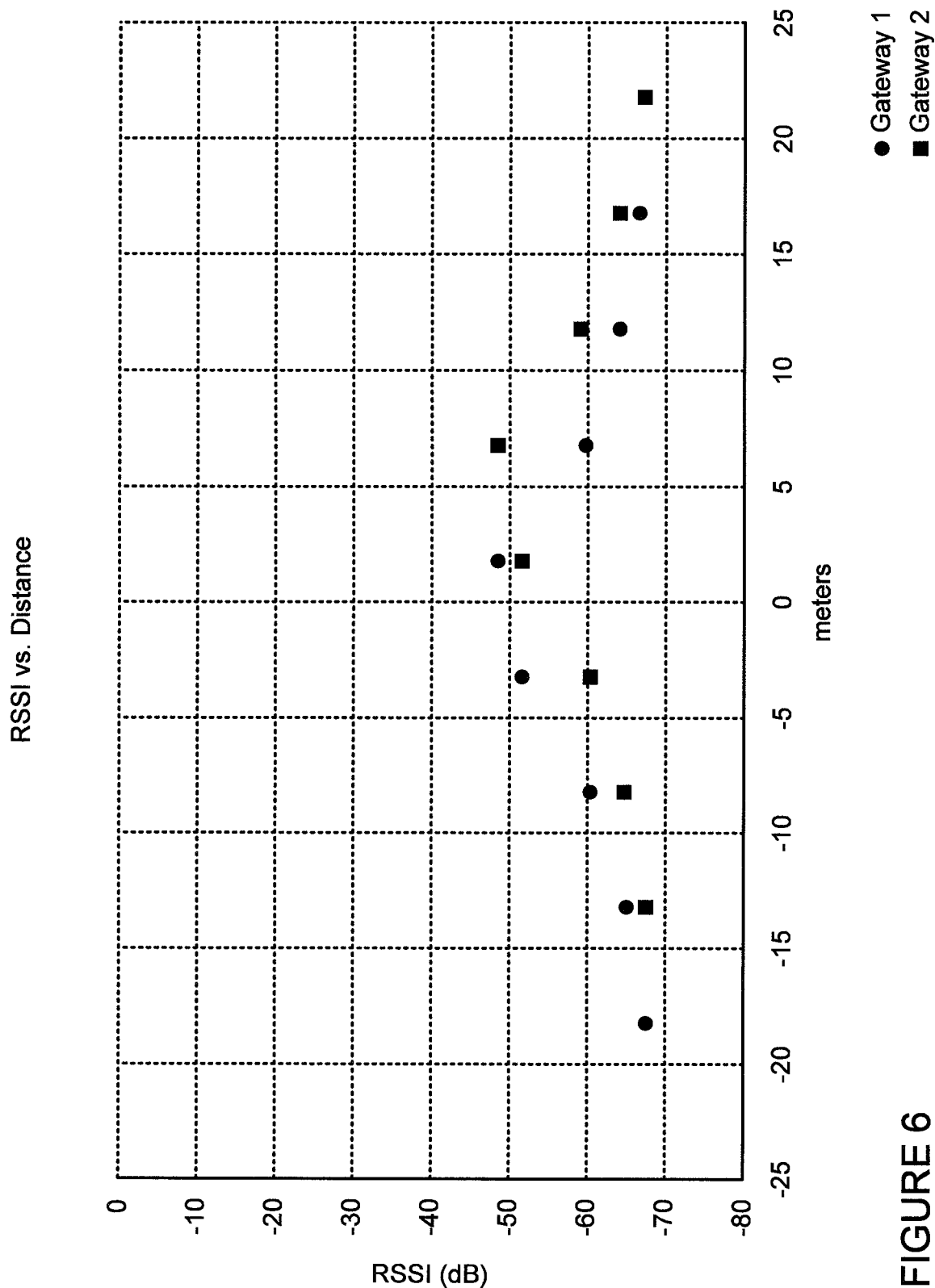
FIG. 6 is a graph of RSSI (Received Signal Strength Indication) values for the same gateways positioned and oriented as in FIG. 5 but with the time between successive sets of radio frequency transmissions, hereinafter referred to as the radio frequency tag transmission period, significantly reduced.

Referring now to FIG. 5, this Figure shows an ideal graph of Received Signal Strength Indication (RSSI) values for a pair of gateways 1 and 2 positioned five meters apart with a subarea boundary interposed between them, and 2.5 meters from each gateway, as a radio frequency tag 46 moves along a line joining the gateways 1 and 2. The distinct peaks in RSSI values for each gateway 1 and 2 allow very accurate tracking as the radio frequency tag crosses between a subarea associated with gateway 1 and a subarea associated with gateway 2. FIG. 6 illustrates the same graph of RSSI values for the same gateways with radio frequency tags moving at the same speed when the radio frequency tag transmission period is significantly longer. A similar result is obtained if the gateways 1 and 2 are brought closer together while maintaining the same radio frequency tag transmission period. As illustrated, in this instance, it is far more difficult to accurately track the radio frequency tag 46 based on the RSSI values. Shorter radio frequency tag transmission periods provide the most accurate tracking but decrease radio frequency tag battery life.

Figure 7:
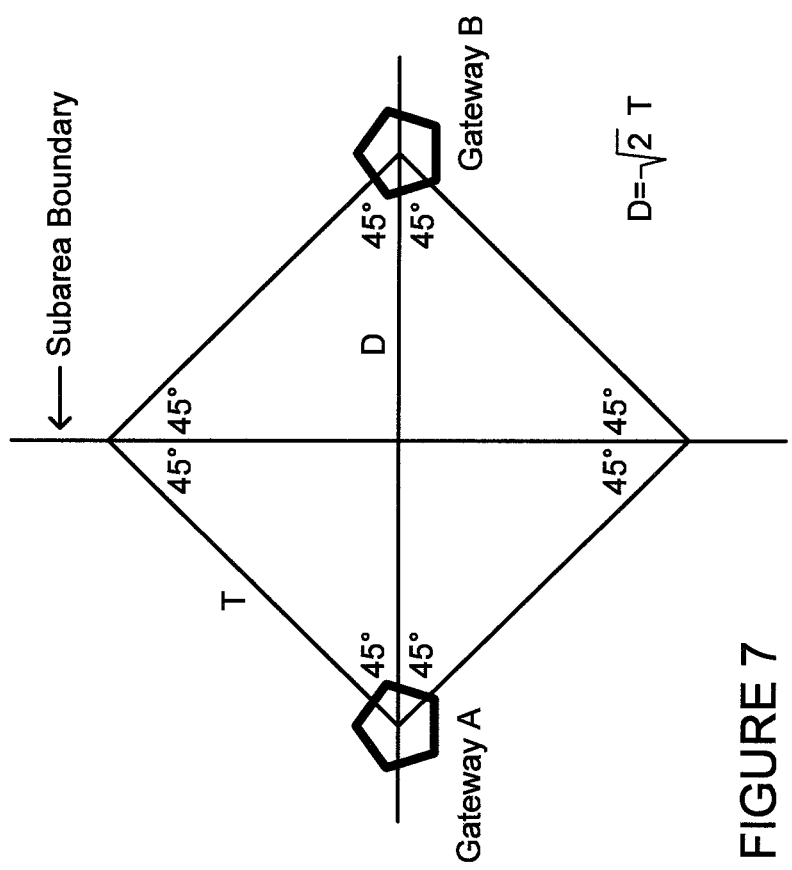
FIG. 7 illustrates that the maximum distance between two adjacent gateways can be determined mathematically based on the maximum distance T between a radio frequency tag and a gateway.

FIG. 7 illustrates that the maximum distance D between two adjacent gateways A and B can be determined mathematically based on the maximum distance T between a radio frequency tag 46 and a gateway (e.g., one of the gateways A or B) that ensures that a meaningful number of radio frequency transmissions are received and recorded by that gateway. The foregoing assumes that each of the gateways A and B have at least a 90 degree field of view and are located such that any passageway between the subareas associated with the two gateways A and B is completely within the field of view of both gateways. This assures that transmissions from radio frequency tags 46 approaching and possibly crossing the subarea boundary are received by both gateways A and B even if the radio frequency tags 46 do not travel along a line connecting the gateways.

The software utilized by the system of the present invention provides configurable parameters that are designed to prevent subarea transition errors due to statistically insignificant variations in Received Signal Strength Indication (RSSI) values. These configurable parameters and other software features also help to accommodate situations in which optimal placement of the gateways A and B is physically impossible. The function and use of these configurable parameters are as follows:

Difference Threshold: For a radio frequency tag that is within the field of view of gateways, this configurable parameter is the absolute value of the difference in perceived signal strength that must exist between the gateways before the system will determine that the radio frequency tag has transitioned from the subarea associated with the gateway having a weaker perceived signal strength to the subarea associated with the gateway having the stronger perceived signal strength. The difference threshold is a configurable parameter that can be applied to any pair of gateways in the system. As an example of how the difference threshold is used, assume the system of the present invention determines that a particular radio frequency tag is in subarea A. Further assume that the aforementioned radio frequency tag is moving away from the gateway A associated with subarea A and moving toward a gateway B associated with subarea B. A difference threshold of 3 dBm between gateway A and gateway B means that the perceived signal strength of the radio frequency tag as measured by gateway B must become 3 dBm higher than the perceived signal strength as measured by gateway A before the system will determine that the radio frequency tag has transitioned from subarea A to subarea B.

Proper adjustment of the difference threshold can prevent the location of a radio frequency tag as determined by the system of the present invention from changing erratically or oscillating between two subareas due to statistically insignificant variances in perceived signal strength when the radio frequency tag is physically positioned within the low confidence region.

Figure 8:
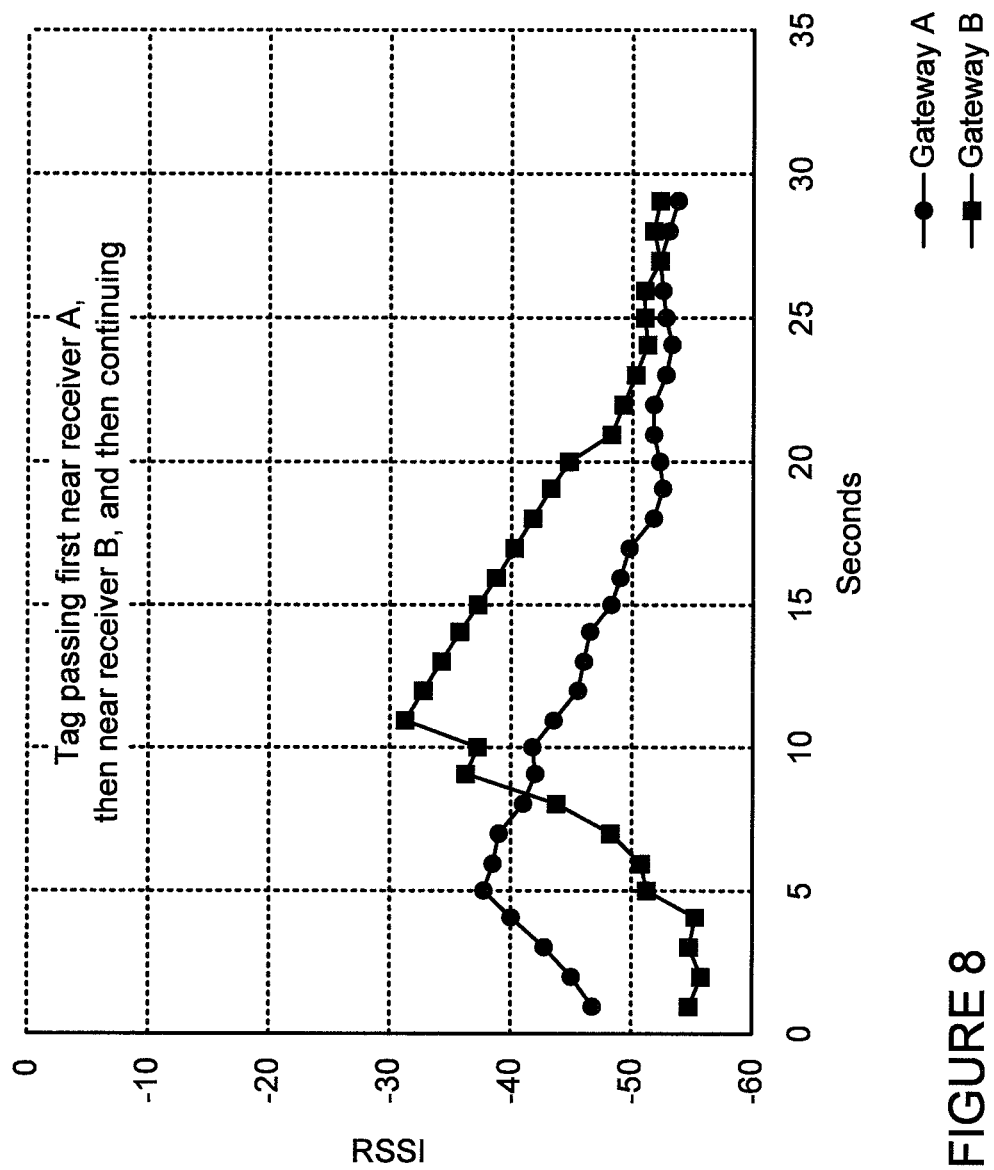
FIG. 8 is a graph of RSSI value versus distance and illustrates that as a radio frequency tag moves further away from a pair of gateways, the difference in the perceived RSSI values of the gateways becomes less deterministic.

FIG. 8 illustrates the RSSI measured by gateways A and B as a radio frequency tag passes near gateway A, then near gateway B, and continues on at a constant velocity. Here it is seen that after the radio frequency tag travels for between 25 and 30 seconds (equivalent to 110 to 132 feet at a typical 3 miles per hour pace), perceived signal strength can no longer determine which gateway is closer to the radio frequency tag. The configurable difference threshold parameter allows the system to ignore small differences in perceived signal strength like those at the far right in FIG. 8, while still allowing the system to determine subarea transitions where perceived signal strengths are similar to those on the far left side of FIG. 8.

The difference threshold between two gateways is set according to circumstances of the particular installation, which typically fall into one of three different categories:

1. The difference threshold is set at a relatively low value, for example 3 dBm, for pairs of gateways having overlapping fields of view that are associated with adjacent subareas that radio frequency tags can transition between (e.g., gateways A and B of FIG. 7). Setting the difference threshold too low can result in a large number of subarea transition errors when a radio frequency tag is close to the subarea transition boundary. As the difference threshold value is set higher, the radio frequency tag has to enter a subarea by a larger distance before the subarea transition is recognized by the system. Conversely, setting the difference threshold too high results in actual subarea transitions not being recognized by the system.
2. The difference threshold for pairs of gateways having with overlapping fields of view associated with subareas that are not adjacent (subarea A and C) and between which radio frequency tags can transition via a third subarea (subarea B), is set to an intermediate value, for example 18 dBm. Setting the difference threshold to an intermediate value inhibits erroneous transitions between subareas A and C, but if the intermediate subarea B transition is missed, the transition between subareas A and C still occurs when the radio frequency tag is close to one of the two gateways associated with subarea A or C. Conversely, setting the difference threshold too high can result in radio frequency tags being "stuck" in subarea A if the transition between subarea A to B is missed.
3. The difference threshold for pairs of gateways having overlapping fields of view that are associated with adjacent subareas that radio frequency tags cannot transition between is set at the maximum value. Such a value is, for practical purposes, infinite. Such a setting ensures that a transition between two subareas in question will not occur. This can be useful when one subarea is above another in a multi-floor building.

Subarea Boundary Offset: This configurable parameter is an assigned offset value that can be configured for any pair of gateways that are not both associated with the same subarea and which have overlapping fields of view (e.g., gateways A and B of FIG. 7). For a given radio frequency tag 46 within the field of view of two gateways, the subarea boundary offset is added to the difference in perceived signal strength between the gateways. The value of the subarea boundary offset is selected such that the difference between the perceived signal strength as measured by the two respective gateways is zero (within normal statistical variation) when a particular radio frequency tag is positioned at the subarea boundary.

The foregoing results in a non-zero subarea boundary offset value whenever the boundary between the two subareas is not equidistant from each gateway of the pair of gateways. When a subarea boundary offset value is zero, the center of the low confidence region will always bisect a line connecting the two gateways. For any two gateways associated with adjacent subareas (subarea A and B), a graphical user interface provided by the software of the system 10 shows whether the offset has the effect of moving the subarea boundary closer to gateway A or to gateway B, and automatically changes the sign of the subarea boundary offset value accordingly.

The system of the present invention provides optimal performance when the Difference Threshold and the Subarea Boundary Offset parameters are properly configured for each gateway pair of the system. To greatly reduce the amount of time required to configure these parameters by trial and error, the system provides an auto-tune feature that can be enabled for each gateway pair. During the auto-tuning interval (e.g. one minute), a reference radio frequency tag (not specifically shown) is placed at a typical height on the boundary line between subareas A and B directly between the associated gateways. The corresponding difference in the perceived signal strength of this reference radio frequency tag is recorded. At the end of the data collecting period the mean and the standard deviation of the aforementioned difference is calculated. The mean is used to set the Subarea Boundary Offset parameter and the standard deviation is used to set the Difference Threshold parameter.

Combining the ability to shape the fields of view of the gateways with opaque and/or absorptive baffles with the appropriate physical positioning of the gateways and the configurable parameters of the software, all of which were previously discussed, permits great flexibility in tailoring the field of view of any particular gateway or pairs of gateways 12, 14, 16 and/or 18 to the geometry of the associated subarea(s).

In addition to determining the subarea in which a person or object of interest is currently present, the software of the present invention records a subarea entry event each time a radio frequency tag 46 enters a specific subarea. This feature is useful for historical reference (e.g., to record when a person of interest visited a specific subarea), and/or to provide a historical record of a sequence of subareas visited by a person of interest on a particular day or within a specific period of time. The time at which a radio frequency tag 46 exits a particular subarea is defined as the time at which it enters an adjoining subarea. Thus, the amount of time spent by a person or object of interest in any subarea of the system can also be determined.

Because the system 10 of the present invention can determine the subarea in which any tracked person or object of interest is present, the software of the present invention can implement various rules relating to the location of tracked persons or objects of interest and issue alarms and/or notifications when these rules are violated. For example, in correctional settings it is often desirable to keep certain persons or groups of persons separated from one another. The software of the present invention allows the system user to define, through a user interface, those persons or groups of persons who should be kept separated. The system 10 can then issue alarms and/or notifications when these persons and/or groups of persons who are to be kept separated are present within the same subarea. Such alarms and notifications can include the persons and/or groups of persons involved and the subarea in which the rule violation occurred or is occurring. The alarms can take various forms including audible alarms like sirens, bells, buzzers, and synthesized speech broadcast over a public address system or visual alarms like flashing lights or emphasized text on a control room display. Notifications can be delivered via email, fax, pagers, and synthesized speech to telephones. Additionally, in correctional settings there are often subareas in which some persons, such as guards or inmate trustees, are allowed and other persons are not allowed. The software of the present invention allows system users to define, through a user interface, those persons or groups of persons who are not allowed access to a particular subarea. As previously described, the system 10 can then issue alarms and/or notifications when these persons and/or groups of persons are present within a subarea in which they are not allowed.

The previously described system 10 of the present invention can operate most accurately if the radio frequency tag 46 transmissions are relatively omnidirectional when they are being worn by a person to be tracked. If this is not accomplished large variations in perceived signal strength at nearby gateways 12, 14, 16 and/or 18 can occur even when a person wearing a radio frequency tag 46 has not changed locations. For example, consider a radio frequency tag 46 that, when being worn by a person being tracked, radiates with substantially more strength in the direction that the person is facing. Further assume that a person wearing such a tag is standing in a Subarea A near a boundary between Subareas A and B. If the person faces toward a gateway B associated with Subarea B and away from a gateway A associated with Subarea A, the perceived signal strength at gateway B may be significantly greater than the perceived signal strength at gateway A. If this difference in perceived signal strength is greater than the difference threshold setting between the gateways A and B, the system of the present invention could incorrectly locate the person in Subarea B.

Figure 9:
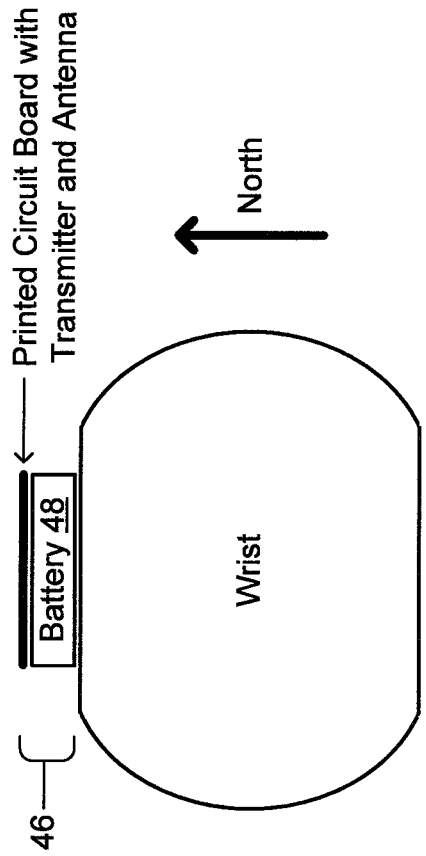
FIG. 9 shows a cross-sectional view of a radio frequency tag utilizing a suboptimal structure, as worn on the wrist of a person with fingers pointing downwardly, away from the viewer; the plane of the cross-section being parallel to the floor of the facility.

Antennas that have omnidirectional radiation patterns in free space become directional when they are worn by a person due to the obstruction of the signal by the human body in some directions and not in other directions. The task of providing a relatively omnidirectional radiation pattern in a small device worn by a person becomes complicated because of many factors including the small physical size of the radio frequency tag 46, obstruction of the radio frequency signal by the materials utilized to construct the tag 46, and obstruction of the radio frequency signal by the person wearing the tag 46. Antennas are commonly surrounded by the maximum free space possible in order to obtain the maximum range. An example of a possible radio frequency tag construction is shown in FIG. 9. This tag construction results in the maximum range in the depicted northerly direction, slightly inhibited range in the easterly and westerly directions due to the proximity of the antenna to the battery, and the maximally inhibited range in the southerly direction due to obstruction of the signal by the battery and the body of the person wearing the radio frequency tag 46. Transmission ranges in the upward and downward directions (into and out of the cross-sectional plane) are similar to those in the easterly and westerly directions.

Because the system 10 of the present invention utilizes active transmitters and very sensitive receivers the lack of range is not a significant problem. It is therefore possible to obtain a more omnidirectional radiation pattern than that in the previously described example of FIG. 9, without increasing the physical size of the radio frequency tag 46, by using components necessary for the operation of the radio frequency tag 46 to obstruct the signal directions that are opposite to those obstructed by the human body when the tag 46 is being worn by the person.

Figure 10:
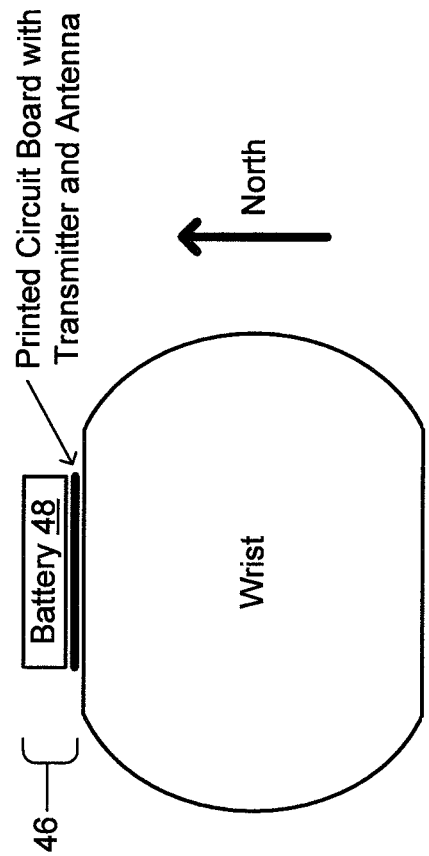
FIG. 10 shows a cross-sectional view of a radio frequency tag utilizing an optimal structure, as worn on the wrist of a person with fingers pointing downwardly, away from the viewer; the plane of the cross-section being parallel to the plane of the floor of the facility.

FIG. 10 shows an alternate arrangement of the radio frequency tag components that, when worn in the arrangement shown, produces a signal radiation pattern that is sufficiently omnidirectional as to provide accurate location by the system 10 of the present invention. The printed circuit board contains the transmitter circuitry and a small, relatively omnidirectional printed antenna. The antenna is substantially covered on one side by the coin cell battery and on the other side by the wrist of the person wearing the tag 46. This arrangement provides approximately equal attenuation of the radio frequency signal on opposing sides, thus approximately maintaining the omnidirectional nature of the unobstructed antenna in the northerly and southerly directions. The small size of the aperture created in all other directions by the close proximity of both the battery and the wrist of the person wearing the tag 46 obstructs the signal in all other directions by a similar amount thus maintaining approximately omnidirectional signal characteristics. Physical differences between persons wearing the radio frequency tags 46 and differences in how tightly the radio frequency tags 46 are worn against the wrist of the person can still produce some directionality in the transmitted signals, but the previously discussed difference threshold adjustment applied to any pair of gateways 12, 14, 16 and/or 18 allows for this variation in signal strength caused by the directionality of the signal and movement of the person wearing the radio frequency tag 46.

Figure 11:
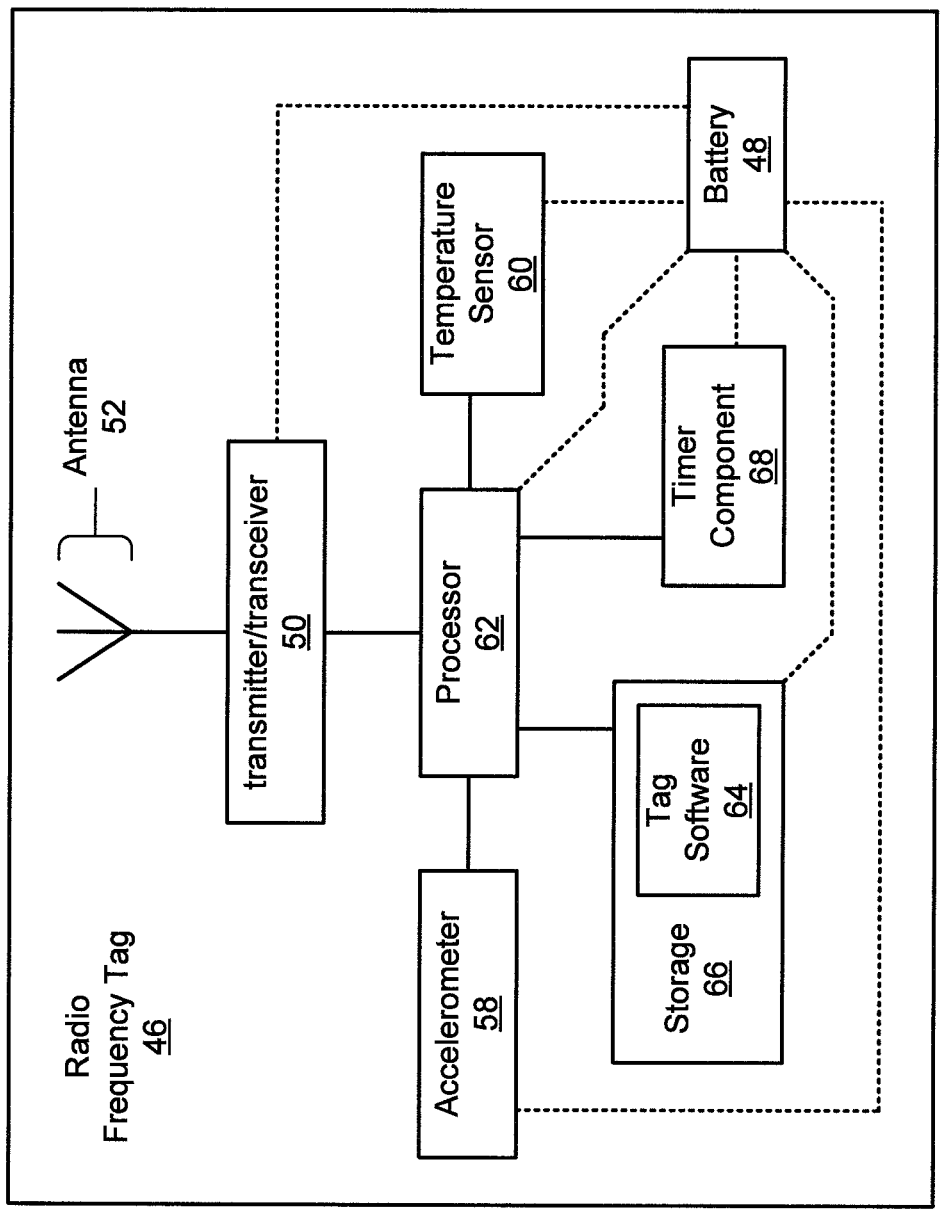
FIG. 11 is a schematic diagram of a radio frequency tag of the present invention.

FIG. 11 depicts an embodiment of an internal architecture of the radio frequency tags 46. As depicted, each of the radio frequency tags 46 may incorporate a processor 62 that may execute tag software 64 stored within a storage 66 also incorporated therein, a timer component 68, and a transmitter/transceiver 50 connected to an antenna 52 to enable wireless communications with the gateways 12, 14, 16 and/or 18, as has been discussed. As also depicted, each of the radio frequency tags 46 may incorporate an accelerometer 58 that enables the detection of movement, and/or a temperature sensor 60 that enables detection that a radio frequency tag 46 is being worn by a person. As further depicted, each of the radio frequency tags 46 may incorporate a battery 48 to provide electric power for the operation of the other aforementioned components 50, 58, 60, 62, 66 and/or 68 of thereof.

As an approach to conserving the limited supply of electric power stored by the battery 48 so as to enable each of the radio frequency tags 46 to be used over a period of one or more years, as discussed above, one or more of the aforementioned components 50, 58, 60, 62, 66 and/or 68 may routinely be placed in a "sleep" state during which each consumes minimal or no electric power. In some embodiments, the amount of time one or more of these components remains in a "sleep" state may be considerably greater than any amount of time spent in an "awake" state. The timer component 68 may be configured to trigger at least the processor 62 to transition from its "sleep" state into its "awake" state at a recurring interval of time. Alternatively, the intervals of time between each such instance of triggering of at least the processor 62 may be randomly varied in length.

In some embodiments, in response to each such instance of being triggered to enter its "awake" state, the processor 62 may be caused to access the tag software 64 within the storage 66, and may be caused by execution of the tag software 64 to perform various functions before again returning to its "sleep" state. Among the various functions that may be so performed may be to access the accelerometer 58 to retrieve indications of detected acceleration(s) therefrom, and/or to access the temperature sensor 60 to retrieve indications of a detected temperature therefrom. Alternatively or additionally, among the various functions that may be so performed may be to operate the transmitter/transceiver 50 to at least transmit the unique identifier assigned to the particular radio frequency tag 46, along with retrieved indications of detected accelerations and/or detected temperatures, to one or more of the gateways 12, 14, 16 and/or 18, as has been previously discussed.

The accelerometer 58 may detect movements of a person. In some embodiments, the accelerometer 58 may be monitored continuously throughout a predetermined period of time to provide an opportunity to detect accelerations (other than an acceleration associated with Earth's gravity) throughout that predetermined period of time. In such embodiments, a lack of detection of any amount of acceleration (other than an acceleration associated with Earth's gravity) throughout the predetermined period of time may be deemed an indication of a lack of movement, and this may be deemed to be an indication that the radio frequency tag 46 is not being worn on any portion of the body of a person. In other embodiments, the accelerometer 58 may also be capable of detecting its own orientation relative to the Earth by relying on detecting the direction of an acceleration associated with Earth's gravity. In such embodiments, the detection of movement that may be associated with the radio frequency tag 46 being worn on a portion of the body of a person may be carried out by comparing at least two samplings of the orientation of the accelerometer 58, where each such sample is taken at a different time (e.g., at a recurring interval of time).

Monitoring the accelerometer 58 over the predetermined period of time to detect accelerations attributable to movement can take far more time than is required to take two or more samples of the current orientation of the accelerometer 58 relative to Earth at different times. This greater amount of time required to perform such monitoring may result in considerably greater consumption of electric power provided by the battery 48 than is required by the taking of two or more samples of current orientation. This arises from the need for at least a portion of the accelerometer 58, the processor 62, the storage 66 and/or other components of the radio frequency tag 46 to be in the aforementioned "awake" state in which they consume a greater amount of electric power from the battery 48 throughout the predetermined period of time. In contrast, such an "awake" state for each instance of sampling of the current orientation of the accelerometer 58 relative to the Earth may be required to last for far less time. Thus, as a measure to extend battery life, such recurring use of repeated orientation sampling may be the preferred approach to detecting movement that may be attributable to a radio frequency tag 46 being worn on a portion of the body of a person.

The temperature sensor 60 may detect the skin temperature of a person, such that the temperature sensor 60 may enable the detection of the removal of a radio frequency tag 46 from a portion of the body of a person of interest. A temperature indication within certain ranges that vary from expected body temperatures can indicate that a radio frequency tag 46 is not being so worn.

In order to provide more accurate radio frequency tag removal determinations under the broadest range of circumstances, algorithms of software executed within the system 10 (e.g., the tracking system software 22 executed by a processor of the computer 20) may utilize movement (based on detected accelerations and/or detected orientations of acceleration) and temperature sensing. For instance, a person may move much less while sleeping, so movement may be given less weight in the radio frequency tag removal determinations.

The radio frequency tags 46 may transmit indications of accelerations detected by their respective accelerometers 58 and/or indications of temperature detected by their respective temperature sensors 60, along with their respective unique identifiers, to one or more of the gateways 12, 14, 16 and/or 18, as has been discussed above. Upon receipt, these indications of acceleration and/or temperature, along with the unique identifiers, may be routed by each of the gateways 12, 14, 16 and 18 to the computer 20 via a LAN and/or other network for analysis. As has been described, such analyses may be performed within the computer 20 (e.g., through execution of the tracking system software 22), and may include one or both of the analyses to determine which subarea each object of interest is currently located within, and to determine whether each radio frequency tag 46 is currently being worn on a portion of a body of a person (e.g., where an object of interest is a person of interest).

In some embodiments, the analysis for determining whether each radio frequency tag 46 is currently being worn on a portion of a body of a person may, in an effort to further improve accuracy, employ additional data as inputs, beyond indications of temperature and/or accelerations received from radio frequency tags 46. Such additional data may include, and is not limited to, indications of ambient air temperature in various subareas as detected by ambient temperature sensors incorporated into the gateways 12, 14, 16 and/or 18, and/or indications of the current time of day provided by a system clock of the computer 20.

By way of example, when the ambient air temperature in a subarea is relatively close to normal skin temperatures, temperature data from the radio frequency tags 46 determined to be within that subarea may be deemed less reliable as an input for determining whether each of those radio frequency tags 46 are currently being worn. Thus, in such a situation, less weight may be given to the indications of temperature being detected by and provided by those radio frequency tags 46. By way of another example, if the time of day is such that it is deemed likely that most persons of interest are sleeping such that they are likely to moving about less than they would while awake, less weight may be given to the indications of accelerations (or lack thereof) being detected by and provided by radio frequency tags 46. More specifically, it may be that more sporadic indications of movement provided by more sporadic indications of changes in orientation of acceleration associated with Earth's gravity (e.g., changes detected over a greater quantity of samplings of orientation over a longer period of time) may be accepted as tending to confirm that a radio frequency tag 46 is still being worn.

Figure 12:
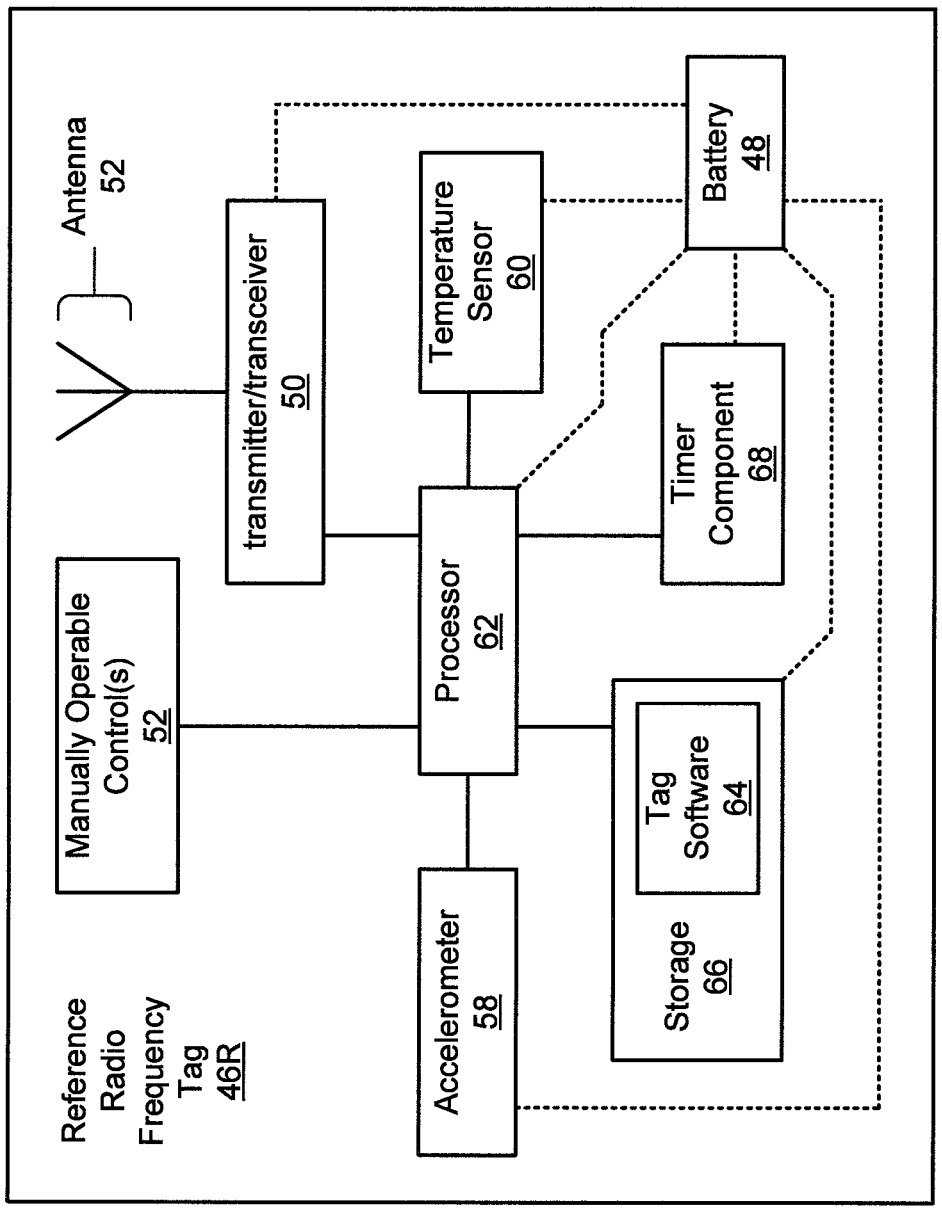
FIG. 12 is a schematic diagram of a reference radio frequency tag of the present invention.

FIG. 12 depicts an embodiment of an internal architecture of a reference radio frequency tag 46R. As previously discussed, to greatly reduce the amount of time required to configure such parameters as the Difference Threshold and/or the Subarea Boundary Offset of at least two of the gateways 12, 14, 16 and/or 18 in a situation in which their fields of view partly overlap at a location where it is possible for an object or person of interest to legitimately move between their corresponding subareas, the system 10 provides an auto-tune feature that can be enabled for such a pair of gateways. During an auto-tuning interval, the reference radio frequency tag 46R is positioned directly between the pair of gateways 12, 14, 16 and/or 18 at a typical height on the boundary line between the corresponding pair of subareas. The corresponding difference in the perceived signal strength of the reference radio frequency tag 46R by each of the pair of gateways 12, 14, 16 and/or 18 is recorded, and is used to set the Subarea Boundary Offset and Difference Threshold parameters. Such parameters are subsequently used to identify instances in which an object or person of interest (as marked by a corresponding radio frequency tag 46) moves from the subarea corresponding to one of the two gateways 12, 14, 16 or 18 of that pair of gateways, and into the subarea corresponding to the other of the two gateways of that pair.

As depicted, the reference radio frequency tag 46R may, in comparison to the radio frequency tag 46 of FIG. 11, additionally incorporate one or more manually operable controls 52 by which use of the reference radio frequency tag 46R in such a process of setting parameters between a pair of gateways 12, 14, 16 and/or 18 as described above may be at least partially manually coordinated by a system user. More specifically, after operation of one of the client computers 24, 26 or 28 to interact with the system 10 to prepare the pair of gateways 12, 14, 16 and/or 18 for such a parameter setting process, a system user may carry the reference radio frequency tag 46R to the aforedescribed location on the boundary between the corresponding pair of subareas, and may then operate the manually operable control(s) 52 to cause the processor 62 of the reference radio frequency tag 46R to operate the transmitter/transceiver 50 to wirelessly interact with the pair of gateways 12, 14, 16 and/or 18 to trigger the measuring of perceived signal strength by each of them such that the corresponding difference therebetween may be derived.

In some embodiments, the processor 62 may be caused, in response to operation of the manually operable control(s) 52 and/or by its execution of the tag software 64, to operate the transmitter/transceiver 50 to transmit signals, one at a time, to the pair of gateways 12, 14, 16 and/or 18, on each of the multiple radio frequencies that are to be used by the radio frequency tags 46 to enable separate measurements of perceived signal strength to be taken by each of that pair of gateways for each such frequency. In so doing, the processor 62 may be caused to operate the transmitter/transceiver 50 to transmit such signals (e.g., repetitively transmitting the unique identifier of the reference radio frequency tag 46R) on each of such channels continuously for a portion of the auto-tuning interval that is deemed sufficiently long as to allow reliable measurements of perceived signal strength to be made. From such separate measurements taken for each such frequency, a separate difference in perceived signal strength may be derived, and correspondingly, separate Subarea Boundary Offset and Difference Threshold parameters may be derived. Alternatively, from such separate measurements taken for each such frequency, an average difference (or other form of aggregated difference) in perceived signal strength may be derived, and correspondingly, Subarea Boundary Offset and Difference Threshold parameters may be derived that are to be applied to all of such frequencies.

It should be noted that, in some embodiments, the reference radio frequency tag 46R may actually be one of the radio frequency tags 46 that has been temporarily reconfigured through use of the near field gateway 38 to serve as the reference radio frequency tag 46R. It may be that such reconfiguration includes forming an association of the function of the reference radio frequency tag 46R with the unique identifier of the one of the radio frequency tags 46 that has been so reconfigured to serve as the reference radio frequency tag 46R.

Figure 13:
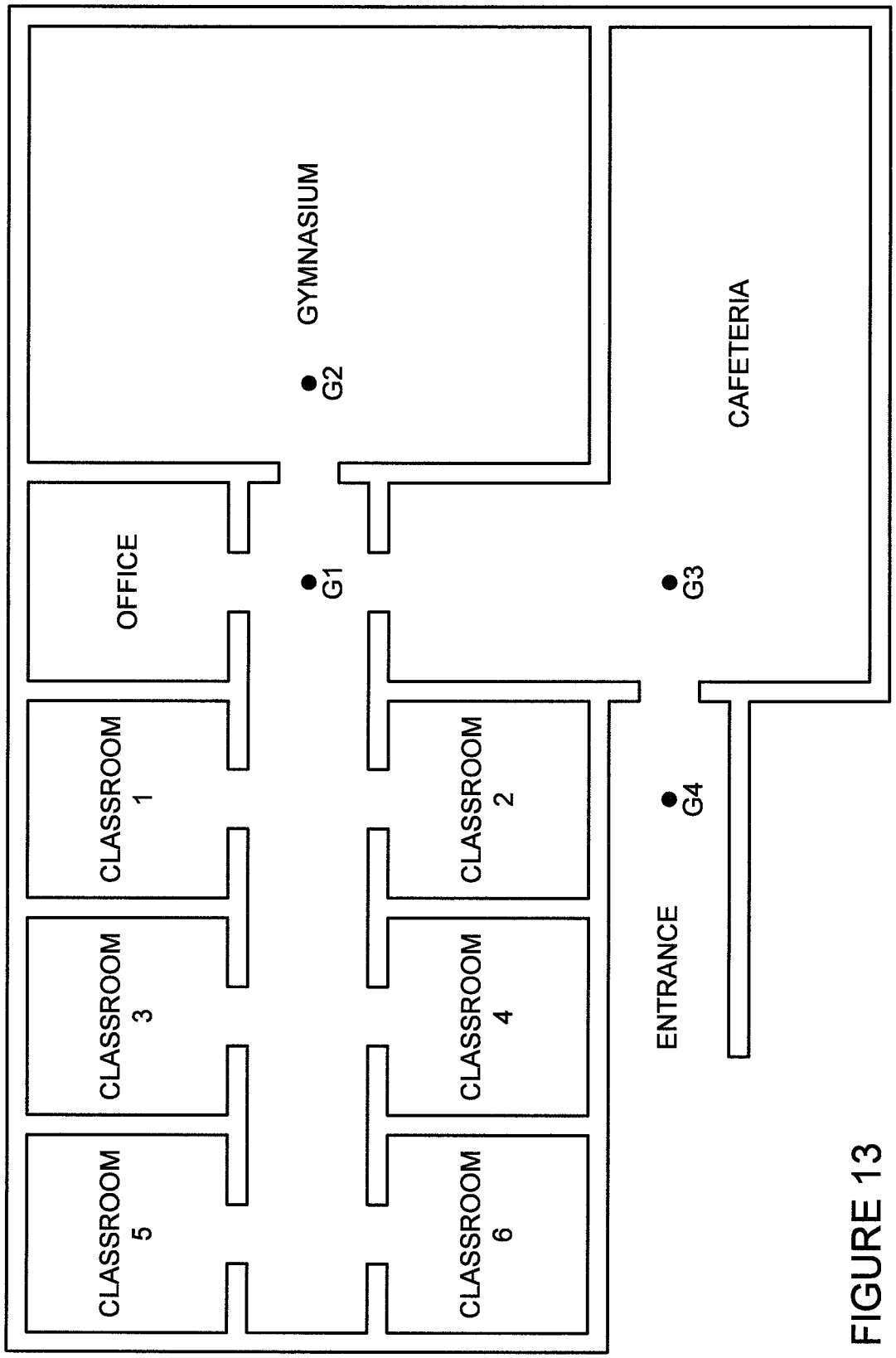
FIG. 13 is an illustration of the preferred embodiment of the present invention in a simplified setting within a facility.

Referring now to FIG. 13, an installation of the preferred embodiment of the present invention in a simplified setting is illustrated. In this case the simplified setting comprises a facility consisting of six classrooms and an office (educational area), a gymnasium (recreational area), and a cafeteria (food service area). The configuration of the system 10 begins by determining how the facility is best divided into subareas, taking into account the needs of the system users. It is assumed that the system users need only to determine whether persons of interest are in the facility and, if so, whether they are in the educational, recreational, or food service areas. It is further assumed that persons of interest do not enter or exit in unusual ways, such as through windows, if any are present. Given the floor plan and the needs of the system user, the goals of the user can be readily accomplished with only four subareas consisting of:

Subarea 1 (Gateway G1)—Educational area (classrooms 1 through 6, and an office)

Subarea 2 (Gateway G2)—Recreational area (gymnasium)

Subarea 3 (Gateway G3)—Food service area (cafeteria)

Subarea 4 (Gateway G4)—Everything outside the facility

Four gateways (i.e., gateways G1, G2, G3 and G4) are positioned as shown. It should be noted that when persons and/or objects of interest are not visible to any radio frequency receiver of any gateway, such as persons and/or objects of interest located in Classroom 5, the system 10 will continue to correctly determine their location as being within subarea 1.

One problem that is apparent in this instance is that tracked persons and/or objects in classroom 2 and classroom 4 may be more visible to gateway G4 than to the gateway associated with their subarea, i.e., gateway G1. This problem is remedied by setting a very high difference threshold parameter between the gateways G1 and G4. This approach eliminates transitions directly between subareas 1 and 4 which are impossible, while allowing all legitimate transitions, such as those between subareas 2 and 1, between subareas 1 and 3, and between subareas 3 and 4.

Another problem is that persons and/or objects of interest in the corner of the recreational area (gymnasium) closest to its entrance may be more visible to gateway G3 than to the gateway associated with its subarea, i.e., gateway G2. This problem is remedied by setting a very high difference threshold parameter between gateways G2 and G3. This approach eliminates transitions directly between subareas 2 and 3 which are impossible, while allowing all legitimate transitions, such as those between subareas 2 and 1, between subareas 1 and 3, and between subareas 3 and 4.

Still another problem arises because gateway G1 is much closer to the doorway connecting the Educational area (subarea 1) with the Food service area (subarea 3) than is the gateway associated with its subarea, i.e., gateway G3. This problem is remedied by using the subarea boundary offset parameter, as previously described, to center the low confidence region on the doorway connecting the Educational area (subarea 1) with the Food service area (subarea 3). After the subarea boundary offset parameter has been properly adjusted, persons and/or objects of interest will be detected as transitioning between subareas 1 and 3 only when they are at or near the passageway connecting the two subareas.

With the aforementioned difference threshold and subarea boundary offset parameters set as described, transitions are allowed only between subareas 1 and 2, between subareas 1 and 3, and between subareas 3 and 4. Persons and/or objects leaving the facility will be detected by gateway G4 and the system will determine that they are outside of the facility (i.e., they are within subarea 4) until they are again detected by gateway G3.

Another issue could arise if it is possible to walk outside near the exterior walls of the facility and an interior gateway (i.e., one of gateways G1, G2 or G3) is located close enough to such an exterior wall to detect radio frequency tags 46 that are outside of the facility (i.e., within subarea 4). For example, assume that a tracked person or object of interest located outside the facility near the wall of the Cafeteria can be detected by gateway G3. This situation can be remedied by adding an additional gateway (not shown) between gateway G4 and gateway G3 near the passageway between the entrance and the Cafeteria. In this case the added gateway must be shielded or otherwise configured so as to filter out radio frequency tags 46 that are not in its immediate vicinity and a very high (infinite) difference threshold must be set between gateway G4 and all of the other gateways within the system, except the added gateway. This approach will allow transitions into the interior of the facility only via gateway G4 and the added gateway, and in that sequence.

In an alternate embodiment of the present invention, sensors such as motion sensors, temperature sensors, capacitance sensors, continuity sensors, and the like are incorporated into the radio frequency tags 46 of the system for the purpose of detecting whether the radio frequency tag 46 is being worn by a person. For example, accelerometers within the radio frequency tag 46 can detect normal movements of a person, temperature sensors can detect skin temperature of a person, capacitance sensors can detect close proximity to a human body, and continuity sensors can detect whether a conductive wristband, or a thin conductor within a wristband, is intact. Data from these sensors is transmitted by the radio frequency tag 46, received by a gateway 12, 14, 16 or 18, and sent along with other data including the unique identifier of the radio frequency tag 46 to the computer 20. These sensor data are analyzed by software of the system 10 to determine whether the radio frequency tag 46 is being worn by a person. For example, lack of movement for a predetermined amount of time could indicate the radio frequency tag 46 is not being worn by a person. A temperature indication within certain ranges that vary from body temperature might also indicate the radio frequency tag 46 is not being worn by a person. Similarly, because people move much less while sleeping, a combination of movement and temperature might be used to determine whether the radio frequency tag 46 is being worn by a person.

In an alternate embodiment of the present invention, presence sensors, such as passive infrared (PIR) sensors, pressure mats, laser beams, noise sensors, and the like are utilized to detect persons who are not wearing radio frequency tags 46, or who are wearing non-functional or defective radio frequency tags 46. In this embodiment of the present invention, the presence sensors are added at or near some or all of the gateways 12, 14, 16 and/or 18. These presence sensors are associated with corresponding gateways 12, 14, 16 and/or 18 within the software of the system 10 when the system 10 is deployed. The detecting range of the presence sensors is set, either physically or electronically, to be within the field of view of the corresponding gateway 12, 14, 16 and/or 18. If a presence sensor is activated, but there is no corresponding radio frequency tag 46 detected by the associated gateway 12, 14, 16 or 18, logic within the software of the invention determines that a person within the monitored area is not wearing a radio frequency tag 46, or is wearing a non-functional or defective radio frequency tag 46. Corresponding alerts and/or reports can then be produced by the system 10.

In another alternate embodiment of the present invention, the subareas of the system 10 are disjointed and need not share boundaries with other subareas. In this configuration, the system 10 can determine if, when, and how long a person or object of interest carrying a radio frequency tag 46 was within any specific subarea, but no other determination with respect to the location of the person or object can be made. An application of this configuration is directed to monitoring whether a person carrying a radio frequency tag 46 has reported to a particular location at a specific time. For example, a security officer on patrol may carry such a radio frequency tag 46. Disjointed subareas are then set up at points that the officer must visit along a predefined route and the system 10 can determine when the officer visited these locations along the route. Additional software logic permits the system 10 to determine whether the officer's visits were made at the proper predetermined dates, times, and/or time between visits, and based on these determinations, the system 10 can detect exceptions or missed visits and issue alerts and/or reports.

In still another alternate embodiment of the present invention, a camera-based system utilizing facial recognition technology replaces the gateways 12, 14, 16 and 18, and the radio frequency tags 46. Because such a system can associate any face known by such a system with a particular person of interest, can collect facial recognition data (a picture) upon entry into any specific subarea by means of at least one camera, and can associate any camera with a specific subarea, the system software can logically determine that any person detected within a specific subarea continues to be present within that subarea regardless of whether that person is presently detected by any system camera, until the person is similarly detected in a different subarea.

In yet another alternate embodiment of the present invention, the radio frequency tags 46 are replaced by a unique optically recognizable pattern (such as a two-dimensional barcode) placed upon persons and/or objects to be tracked, and cameras or other optical sensors (scanners) replace the gateways 12, 14, 16 and 18. Because uniforms are provided to persons in some environments, it is possible to print an optically recognizable pattern on several areas of the uniform such that the pattern can be recognized by the optical sensors regardless of the person's position or orientation with respect to the sensor.

In a further embodiment of the present invention, some or all of the gateways 12, 14, 16 and/or 18 are configured into physical portals through which monitored persons and/or objects of interest must pass to enter into or exit from a particular subarea(s). All gateways 12, 14, 16 and/or 18 comprising a given portal are associated with the same subarea. In this arrangement monitored persons and/or objects of interest pass in very close proximity to the portal's gateway when entering and/or exiting the subarea. This configuration can increase accuracy and can decrease the output power requirements of the radio frequency tags 46, thus increasing battery life.

In a still further embodiment of the present invention, some or all of the gateways 12, 14, 16 and/or 18 are wirelessly connected handheld devices. These handheld gateways 12, 14, 16 and/or 18 are connected to, and are controlled and monitored by, a computer system executing software, but each handheld gateway has a user interface that permits changing the subarea associated with the handheld gateway, as required. The handheld gateways are useful for determining which persons and/or objects of interest are located in areas not equipped with permanently installed gateways.

Certain modifications and improvements will occur to those skilled in the art upon reading the foregoing. It is understood that all such modifications and improvements have not been included herein for the sake of conciseness and readability, but are properly within the scope of the following claims.

The invention claimed is:

1. A method of determining which subarea within a plurality of subareas comprising an area to be monitored contains an object of interest that may move between subareas comprising the steps of:
   a) associating each of said subareas with at least one gateway device, each said gateway device being associated with only one subarea, said gateway device being capable of detecting the presence of a radio frequency signal from a first object of interest within at least a portion of said subarea with which said gateway device is associated and through which said first object of interest must pass in order to be located within said subarea;
   b) determining the strength of said radio frequency signal being received from said first object of interest by at least one gateway device;
   c) analyzing said strength of said radio frequency signal being received by at least one gateway device, said analysis including the application of configurable parameters when said radio frequency signal is received by more than one said gateway device to determine the subarea in which said first object of interest is present; and
   d) applying rules identifying a second object of interest that is not permitted in the same subarea as said first object of interest, said first and second objects of interest being persons.

2. The method of claim 1 further comprising:
   analyzing another radio frequency signal received by at least two of said at least one gateway device from a reference radio frequency tag to derive a difference in perceived signal strength of said another radio frequency signal at each of the said at two of said at least one gateway device; and
   deriving said configurable parameters for said at least one gateway device from said difference in perceived signal strength.

3. A system for determining which subarea within a plurality of subareas comprising an area to be monitored contains an object of interest that may move between said subareas comprising at least one gateway device associated with each of said subareas and having a field of view within its associated subarea, a transmitter device operatively attached to said object of interest, said transmitter device transmitting a unique identifier for said object of interest, a computer device operatively connected to said gateway device, said computer device executing software associating said unique identifier with said object of interest and determining the subarea in which said object of interest is present regardless of whether said object of interest is being continuously detected by said gateway device, said transmitter device being a radio frequency tag comprising electrical circuitry and a battery, said electrical circuitry being interposed between said battery and said object of interest, said radio frequency tag becoming substantially omnidirectional when operatively attached to said object of interest.

4. The system of claim 3 wherein said electrical circuitry comprises a radio frequency transmitter and an antenna.

5. The system of claim 3 wherein:
   said object of interest is a person of interest;
   said radio frequency tag comprises at least one of an accelerometer to detect an acceleration, or a temperature sensor to detect a temperature;
   said radio frequency tag transmits an indication of at least one of the detected acceleration or the detected temperature along with said unique identifier; and
   said software executed by said computer device analyzes the at least one of the detected acceleration or the detected temperature to determine whether said radio frequency tag is currently worn by said person of interest.

6. A system for determining which subarea within a plurality of subareas comprising an area to be monitored contains an object of interest that may move between said subareas comprising at least one gateway device associated with each of said subareas and having a field of view within its associated subarea, a transmitter device operatively attached to said object of interest, said transmitter device being a radio frequency tag, said transmitter device transmitting a unique identifier for said object of interest, a computer device operatively connected to said gateway device, said computer device executing software associating said unique identifier with said object of interest and determining the subarea in which said object of interest is present regardless of whether said object of interest is being continuously detected by said gateway device, further including at least one remote computer device operatively connected to said computer device permitting said at least one remote computer device to access the determinations relating to said subarea in which said object of interest is present and including a near field gateway device operatively connected to said at least one remote computer device, said near field gateway device being utilized to create an association between the identity of the object of interest with its said unique identifier contained in its associated radio frequency tag.

7. The system of claim 6 wherein:
   said object of interest is a person of interest;

said radio frequency tag comprises at least one of an accelerometer to detect an acceleration, or a temperature sensor to detect a temperature;
said radio frequency tag transmits an indication of at least one of the detected acceleration or the detected temperature along with said unique identifier; and
said software executed by said computer device analyzes the at least one of the detected acceleration or the detected temperature to determine whether said radio frequency tag is currently worn by said person of interest.

8. The system of claim 7, wherein:
said gateway device comprises an ambient temperature sensor to detect an ambient temperature of a subarea of said subareas that is associated with said gateway device;
said computer device comprises a system clock to provide a time of day;
said software executed by said computer device employs at least one of the detected ambient temperature and the time of day in the analysis of the at least one of the detected acceleration or the detected temperature to determine whether said radio frequency tag is currently worn by said person of interest.

9. A method of determining which subarea within a plurality of subareas comprising an area to be monitored contains an object of interest that may move between said subareas comprising the steps of:
 a) associating each of the said subareas with at least one gateway device, each said gateway device being associated with only one subarea, said gateway device being capable of detecting the presence of a radio frequency signal from said object of interest within at least a portion of said subarea with which said gateway device is associated and through which said object of interest must pass in order to be located within said subarea, said object of interest being operatively attached to a radio frequency tag incorporating a unique identifier, said gateway device being capable of reading said unique identifier, said radio frequency tag transmitting said unique identifier substantially periodically on multiple radio frequencies sequentially in random order;
 b) determining the strength of said radio frequency signal being received from said object of interest by at least one said gateway device; and
 c) analyzing said strength of said radio frequency signal being received by said at least one gateway device by utilizing configurable parameters comprising zone boundary offset parameters and difference threshold parameters, said analysis including the application of at least one of said configurable parameters when said radio frequency signal is received by more than one said gateway device to determine the subarea in which said object of interest is present.

10. The method of claim 9 wherein:
said object of interest is a person of interest;
said radio frequency tag comprises at least one of an accelerometer to detect an acceleration, or a temperature sensor to detect a temperature;
said radio frequency tag transmits an indication of at least one of the detected acceleration or the detected temperature along with said unique identifier; and
said software executed by said computer device analyzes the at least one of the detected acceleration or the detected temperature to determine whether said radio frequency tag is currently worn by said person of interest.

11. The method of claim 10, wherein:
said gateway device comprises an ambient temperature sensor to detect an ambient temperature of a subarea of said subareas that is associated with said gateway device;
said computer device comprises a system clock to provide a time of day;
said software executed by said computer device employs at least one of the detected ambient temperature and the time of day in the analysis of the at least one of the detected acceleration or the detected temperature to determine whether said radio frequency tag is currently worn by said person of interest.

12. A method of determining which subarea within a plurality of subareas comprising an area to be monitored contains an object of interest that may move between said subareas comprising the steps of:
 a) associating each of said subareas with at least one gateway device, each said gateway device being associated with only one subarea, said gateway device being capable of detecting the presence of a radio frequency signal from said object of interest within at least a portion of said subarea with which said gateway device is associated and through which said object of interest must pass in order to be located within said subarea, said object of interest being operatively attached to a radio frequency tag incorporating a unique identifier, said gateway device being capable of reading said unique identifier, said radio frequency tag transmitting said unique identifier substantially periodically on multiple radio frequencies, said gateway device including multiple single channel receivers each set to one of said multiple radio frequencies;
 b) determining the strength of said radio frequency signal being received from said object of interest by at least one said gateway device; and
 c) analyzing said strength of said radio frequency signal by said at least one gateway device by utilizing configurable parameters comprising zone boundary offset parameters and difference threshold parameters, said analysis including the application of at least one of said configurable parameters when said radio frequency signal is received by more than one said gateway device to determine the subarea in which said object of interest is present.

13. The method of claim 12 wherein:
said object of interest is a person of interest;
said radio frequency tag comprises at least one of an accelerometer to detect an acceleration, or a temperature sensor to detect a temperature;
said radio frequency tag transmits an indication of at least one of the detected acceleration or the detected temperature along with said unique identifier; and
said software executed by said computer device analyzes the at least one of the detected acceleration or the detected temperature to determine whether said radio frequency tag is currently worn by said person of interest.

14. The method of claim 12 further comprising:
analyzing another radio frequency signal received by said more than one said gateway device from a reference radio frequency tag to derive a difference in perceived signal strength of said another radio frequency signal at each of the said more than one gateway device; and deriving said configurable parameters for said at least one gateway device from said difference in perceived signal strength.

15. The method of claim 14 wherein:
said reference radio frequency tag transmits multiple other radio frequency signals, each transmitted at a different one of said multiple radio frequencies; and
deriving said configurable parameters for said at least one gateway device from differences in perceived signal strength associated with each of said multiple radio frequencies.

16. A method of determining which subarea within a plurality of subareas comprising an area to be monitored contains an object of interest that may move between said subareas comprising the steps of:
a) associating each of said subareas with at least one gateway device, each said gateway device being associated with only one subarea, said gateway device being capable of detecting the presence of a radio frequency signal from said object of interest within at least a portion of said subarea with which said gateway device is associated and through which said object of interest must pass in order to be located within said subarea, said object of interest being a first object of interest that may move between said subareas within said area to be monitored;
b) determining the strength of said radio frequency signal being received from said first object of interest by at least one gateway device;
c) analyzing said strength of said radio signal being received by said at least one gateway device by utilizing configurable parameters comprising zone boundary offset parameters and difference threshold parameters, said analysis including the application of at least one of said configurable parameters when said radio frequency signal is received by more than one said gateway device to determine the subarea in which said first object of interest is present; and
d) applying rules identifying a second object of interest that is not permitted in the same subarea as said first object of interest.

17. The method of claim 16 further comprising:
analyzing another radio frequency signal received by said more than one said gateway device from a reference radio frequency tag to derive a difference in perceived signal strength of said another radio frequency signal at each of the said more than one gateway device; and
deriving said configurable parameters for said at least one gateway device from said difference in perceived signal strength.

18. A system for determining which subarea within a plurality of subareas comprising an area to be monitored contains an object of interest that may move between said subareas in any order comprising at least one gateway device associated with each of said subareas and having a field of view within its associated subarea, a transmitter device operatively attached to said object of interest, said transmitter device transmitting a unique identifier for said object of interest, said transmitter device being a radio frequency tag, said radio frequency tag transmitting said unique identifier on multiple radio frequencies, said gateway device including multiple single channel receivers each set to one of said multiple radio frequencies, and a computer device operatively connected to said gateway device, said computer device executing software associating said unique identifier with said object of interest and determining the subarea in which said object of interest is present regardless of whether said object of interest is being continuously detected by said gateway device.

19. The system of claim 18 wherein:
said radio frequency tag transmits said unique identifier substantially periodically; and
said radio frequency tag transmits said unique identifier on said multiple radio frequencies sequentially in random order to enable a different one of said multiple single channel receivers to receive the said unique identifier with each transmission thereof.

20. The system of claim 18 wherein:
said object of interest is a person of interest;
said radio frequency tag comprises at least one of an accelerometer to detect an acceleration, or a temperature sensor to detect a temperature;
said radio frequency tag transmits an indication of at least one of the detected acceleration or the detected temperature along with said unique identifier; and
said software executed by said computer device analyzes the at least one of the detected acceleration or the detected temperature to determine whether said radio frequency tag is currently worn by said person of interest.

\* \* \* \* \*